(12) United States Patent
Hodson

(10) Patent No.: US 7,172,814 B2
(45) Date of Patent: Feb. 6, 2007

(54) FIBROUS SHEETS COATED OR IMPREGNATED WITH BIODEGRADABLE POLYMERS OR POLYMERS BLENDS

(75) Inventor: Simon K. Hodson, Santa Barbara, CA (US)

(73) Assignee: Bio-Tec Biologische Naturverpackungen GmbH & Co (DE)

( * ) Notice: Subject to any disclaimer, the term of this patent is extended or adjusted under 35 U.S.C. 154(b) by 248 days.

(21) Appl. No.: 10/453,318

(22) Filed: Jun. 3, 2003

(65) Prior Publication Data

US 2004/0248486 A1    Dec. 9, 2004

(51) Int. Cl.
*B32B 23/00*    (2006.01)
*B32B 25/10*    (2006.01)
*B32B 27/10*    (2006.01)

(52) U.S. Cl. .................. 428/479.6; 428/219; 428/220; 428/423.1; 428/481; 229/87.08

(58) Field of Classification Search ............. 428/423.1, 428/425.1, 479.6, 481, 219, 220; 229/87.08
See application file for complete search history.

(56) References Cited

U.S. PATENT DOCUMENTS

| | | | |
|---|---|---|---|
| 4,318,950 A | 3/1982 | Takashi et al. |
| 4,364,985 A | 12/1982 | Tokuyama et al. |
| 4,536,531 A | 8/1985 | Ogawa et al. |
| 5,053,482 A | 10/1991 | Tietz |
| 5,080,665 A | 1/1992 | Jarrett et al. |
| 5,097,004 A | 3/1992 | Gallagher et al. |
| 5,097,005 A | 3/1992 | Tietz |
| 5,124,371 A | 6/1992 | Tokiwa et al. |
| 5,171,308 A | 12/1992 | Gallagher et al. |
| 5,200,247 A | 4/1993 | Wu et al. |
| 5,219,646 A | 6/1993 | Gallagher et al. |
| 5,234,977 A | 8/1993 | Bastioli et al. |
| 5,236,762 A | 8/1993 | Suzuki et al. |
| 5,252,642 A | 10/1993 | Sinclair et al. |
| 5,254,607 A | 10/1993 | McBride et al. |
| 5,258,430 A | 11/1993 | Bastioli et al. |
| 5,262,458 A | 11/1993 | Bastioli et al. |
| 5,280,055 A | 1/1994 | Tomka |
| 5,286,770 A | 2/1994 | Bastioli et al. |
| 5,288,765 A | 2/1994 | Bastioli et al. |
| 5,292,782 A | 3/1994 | Bastioli et al. |
| 5,292,783 A | 3/1994 | Buchanan et al. |
| 5,295,985 A | 3/1994 | Romesser et al. |
| 5,296,229 A | 3/1994 | Grandjean |
| 5,314,934 A | 5/1994 | Tomka |
| 5,354,616 A | 10/1994 | Fish, Jr. et al. |
| 5,360,830 A | 11/1994 | Bastioli et al. |
| 5,362,777 A | 11/1994 | Tomka |
| 5,407,979 A | 4/1995 | Wu et al. |
| 5,412,005 A | 5/1995 | Bastioli et al. |
| 5,415,827 A | 5/1995 | Tomka et al. |
| 5,422,387 A | 6/1995 | Toms et al. |
| 5,444,107 A | 8/1995 | Ajioka et al. |
| 5,446,079 A | 8/1995 | Buchanan et al. |
| 5,462,980 A | 10/1995 | Bastioli et al. |
| 5,462,982 A | 10/1995 | Bastioli et al. |
| 5,512,378 A | 4/1996 | Bastioli et al. |
| 5,525,281 A | 6/1996 | Lörcks et al. |
| 5,534,150 A | 7/1996 | Bastioli et al. |
| 5,550,173 A | 8/1996 | Hammond et al. |
| 5,559,171 A | 9/1996 | Buchanan et al. |
| 5,569,692 A | 10/1996 | Bastioli et al. |
| 5,580,911 A | 12/1996 | Buchanan et al. |
| 5,589,518 A | 12/1996 | Bastioli et al. |
| 5,599,858 A | 2/1997 | Buchanan et al. |
| 5,663,216 A | 9/1997 | Tomka |
| 5,700,344 A | 12/1997 | Edgington et al. |
| 5,700,901 A | 12/1997 | Hurst et al. |
| 5,705,536 A | 1/1998 | Tomka |
| 5,726,220 A | 3/1998 | Tokushige et al. |
| 5,760,144 A | 6/1998 | Ozeki et al. |
| 5,766,748 A | 6/1998 | Ikado et al. |
| 5,770,137 A | 6/1998 | Lörcks et al. |
| 5,783,271 A | 7/1998 | Nishida et al. |
| 5,786,408 A | 7/1998 | Kuroda et al. |
| 5,817,721 A | 10/1998 | Warzelhan et al. |

(Continued)

FOREIGN PATENT DOCUMENTS

EP    0 400 532 A1    12/1990

(Continued)

*Primary Examiner*—Ana Woodward
(74) *Attorney, Agent, or Firm*—Workman Nydegger

(57) ABSTRACT

Fibrous sheets are coated or impregnated with a biodegradable composition to render the sheets more resistant to penetration by liquids. Biodegradable polymer blends suitable for use in coating or impregnating a fibrous sheet can be manufactured from at least one "hard" biodegradable polymer and at least one "soft" biodegradable polymer. "Hard" biopolymers typically have a glass transition temperature of at least about 10° C. "Soft" biodegradable polymers typically have a glass transition temperature less than about 0° C. Another useful biodegradable polymer composition includes one or more biodegradable polymers and sufficient inorganic filler so as to render the treated sheet microwaveable. The biodegradable polymer compositions are especially well-suited for coating or impregnating paper sheets, e.g., 12–15 lb/3000 ft$^2$ tissue paper to yield food wraps. Food wraps will typically be manufactured to have good "dead-fold" properties so as to remain in a wrapped position and not spring back to an "unwrapped" form.

49 Claims, 9 Drawing Sheets

U.S. PATENT DOCUMENTS

| | | | |
|---|---|---|---|
| 5,821,286 A | 10/1998 | Xu et al. | |
| 5,844,023 A | 12/1998 | Tomka | |
| 5,866,634 A | 2/1999 | Tokushige et al. | |
| 5,883,199 A | 3/1999 | McCarthy et al. | |
| 5,897,944 A | 4/1999 | Loercks et al. | |
| 5,900,322 A | 5/1999 | Buchanan et al. | |
| 5,910,350 A | 6/1999 | Loracks et al. | |
| 5,910,545 A | 6/1999 | Tsai et al. | |
| 5,916,950 A | 6/1999 | Obuchi et al. | |
| 6,054,218 A | 4/2000 | Nucci et al. | |
| 6,062,228 A | 5/2000 | Loercks et al. | |
| 6,096,809 A | 8/2000 | Lorcks et al. | |
| 6,117,925 A | 9/2000 | Tomka | |
| 6,130,271 A | 10/2000 | Jarrett et al. | |
| 6,136,097 A | 10/2000 | Lörcks et al. | |
| 6,146,750 A | 11/2000 | Kotani et al. | |
| 6,150,490 A | 11/2000 | Deckwer et al. | |
| 6,168,857 B1 | 1/2001 | Andersen et al. | |
| 6,183,814 B1 * | 2/2001 | Nangeroni et al. | 427/361 |
| 6,201,034 B1 | 3/2001 | Warzelhan et al. | |
| 6,214,907 B1 | 4/2001 | Tomka | 524/47 |
| 6,218,321 B1 | 4/2001 | Lorcks et al. | 442/165 |
| 6,231,970 B1 | 5/2001 | Andersen et al. | 428/332 |
| 6,235,815 B1 | 5/2001 | Loercks et al. | 524/47 |
| 6,235,816 B1 | 5/2001 | Lorcks et al. | 524/47 |
| 6,235,825 B1 | 5/2001 | Yoshida et al. | |
| 6,242,102 B1 | 6/2001 | Tomka et al. | 428/451 |
| 6,265,067 B1 | 7/2001 | Nucci et al. | |
| 6,326,440 B1 | 12/2001 | Terada et al. | |
| 6,350,530 B1 | 2/2002 | Morikawa et al. | |
| 6,472,497 B2 | 10/2002 | Loercks et al. | 528/196 |
| 6,479,164 B1 | 11/2002 | Lörcks et al. | 428/532 |
| 6,573,340 B1 | 6/2003 | Khemani et al. | |
| 6,583,232 B1 * | 6/2003 | Brown | 525/410 |
| 6,787,613 B2 * | 9/2004 | Bastioli et al. | 525/411 |
| 2001/0003761 A1 | 6/2001 | Ishibashi et al. | |
| 2002/0028857 A1 | 3/2002 | Holy | |
| 2002/0098341 A1 | 7/2002 | Schiffer et al. | |

FOREIGN PATENT DOCUMENTS

| | | |
|---|---|---|
| EP | 0 525 245 A1 | 2/1993 |
| EP | 0 539 541 B1 | 5/1993 |
| EP | WO 02/16468 A1 * | 2/2002 |
| WO | WO 90/05161 | 5/1990 |
| WO | WO 92/09654 | 6/1992 |
| WO | WO 96/15173 | 5/1996 |
| WO | WO 96/15174 | 5/1996 |
| WO | WO 02/42365 | 5/2002 |

* cited by examiner

FIBROUS SHEETS COATED OR IMPREGNATED WITH BIODEGRADABLE POLYMERS OR POLYMERS BLENDS

BACKGROUND OF THE INVENTION

1. The Field of the Invention

The present invention relates generally to biodegradable polymers or polymer blends and sheets manufactured therefrom. More particularly, the present invention relates to fibrous sheets that are coated or impregnated with biodegradable polymers or blends that render the sheets more resistant to liquids. The resulting sheets are suitable for a number of applications, such as disposable wraps, bags, pouches or other packaging materials.

2. The Relevant Technology

As affluence grows, so does the ability to purchase and accumulate more things. Never before in the history of the world has there been such a large number of people with such tremendous buying power. The ability to purchase relatively inexpensive goods, such as books, tools, toys and food, is a luxury enjoyed by virtually all levels of society, even those considered to be at the poorer end of the spectrum. Because a large percentage of what is purchased is prepackaged, there has been a tremendous increase in the amount of disposable packaging materials that are routinely discarded into the environment as solid waste. Thus, as society becomes more affluent, it generates more disposable trash.

Some packaging materials are only intended for a single use, such as boxes, cartons, pouches, bags and wraps used to package items purchased from wholesale and retail outlets. Even the advent of computers and "paperless" transactions has not stemmed the rising tide of packaging wastes. Indeed, the onset of "e-commerce" has spawned a great mail-order fad, thus creating a whole new market of individually packaged and shipped items.

Moreover, the modern, fast-paced lifestyle has greatly disrupted traditional eating routines in which people prepared their own meals and sat down as a family or group. Instead, people grab food on the run, thus creating ever-increasing amounts of fast-food packaging materials that are used once and then discarded. In view of the high volume of disposable packaging materials being generated, some countries, particularly those in Europe, have mandated either the recycling of fast food generated wastes or the use of packaging materials which are "biodegradable" or "compostable". Environmental activists commonly pressure companies that generate solid waste to find more environmentally friendly alternatives. There is therefore an ever-present need to develop biodegradable alternatives to nonbiodegradable packaging materials.

Paper, paperboard and other fibrous sheets made from natural cellulose-based fibers are biodegradable. However, fibrous sheets tend to be porous. As a result, they do not provide good barriers against water, oil or other liquids. When fibrous sheets are used in applications where they will be exposed to liquids, they must generally be treated with a liquid-resistant material, such as paraffin wax or plastic. By doing so, however, the fibrous sheets are no longer biodegradable, but are as resistant to degradation as plastic or paraffin wax.

In view of the foregoing, it would be an advancement in the art to provide fibrous sheets that were resistant to liquids and that were biodegradable. In addition or alternatively, it would be a further advancement in the packaging art to provide improved fibrous sheets that were not only resistant to liquids, but still had good breathability and water vapor transmission compared to conventional fibrous sheets treated with wax or plastic.

SUMMARY OF THE INVENTION

The invention encompasses fibrous sheets that are coated or impregnated with biodegradable polymers or polymer blends in order to yield sheets that are more resistant to liquids (generally "treated sheets" or "treated fibrous sheets"). The treated sheets can be used to manufacture a wide variety of articles of manufacture, including packaging materials, such as wraps, bags, pouches, cartons, jugs, cups, plates, bowls, trays, platters, lids, straws, and the like.

Exemplary fibrous sheets that may be treated with biodegradable polymers include, but are not limited to, tissue papers, paper sheets, felts, paperboard, wovens and nonwovens. In one aspect of the invention, fibrous sheets are coated or impregnated with a biodegradable polymer blend comprising at least one thermoplastic biodegradable polymer having relatively high stiffness and at least one thermoplastic biodegradable polymer having relatively high flexibility. Thus, the present invention provides blends that possess or demonstrate surprising synergistic effects that are particularly well-suited by use in treating fibrous sheets.

For example, blends containing a relatively stiff BIOMAX polymer, a modified polyethylene terephthalate (PET) sold by DuPont, and a relatively soft or flexible polymer ECOFLEX, an aliphatic-aromatic copolymer sold by BASF, and/or EASTAR BIO, an aliphatic-aromatic copolymer sold by Eastman Chemical, have been shown to have strength and elongation properties which are superior to either biopolymer taken alone. Other stiff biopolymers include BAK, a polyesteramide sold by Bayer, and polylactic acid (PLA).

BIOMAX is characterized as having a relatively high glass transition temperature and is highly crystalline at room temperature. BIOMAX tends to be quite stiff or brittle when formed into films or sheets. It also has poor elongation or elasticity. ECOFLEX and EASTAR BIO, on the other hand, are characterized as having relatively low glass transition temperatures and are relatively amorphous or noncrystalline at room temperature, all of which contribute to the high softness, elasticity and high elongation. Even so, various blends of BIOMAX and ECOFLEX and/or EASTAR BIO actually exhibit higher elongation than ECOFLEX by itself, as well as higher break stress compared to either BIOMAX or ECOFLEX by themselves.

Other polymer blends that can be used to treat fibrous sheets include, but are not limited to, a blend of ECOFLEX, PLA and thermoplastic starch (TPS) and a blend of BAK (a polyesteramide manufactured by Bayer Corporation) and TPS. In each case, blending a biopolymer having a relatively low glass transition temperature with a biopolymer having a relatively high glass transition temperature results in a polymer blend that exhibits the desired characteristics of each polymer by itself. In some cases, the blends exhibit better properties, while diminishing or minimizing the negative properties of each biopolymer by itself.

In general, biodegradable polymers that may be characterized as being relatively "stiff" or less flexible include polymers that have a glass transition temperature of at least about 10° C. Conversely, biodegradable polymers that may be characterized as being relatively "soft" include polymers that have a glass transition temperature less than about 0° C. "Stiff" biodegradable polymers preferably have a glass transition temperature of at least about 15° C., more preferably at least about 25° C., and most preferably at least about 35° C. "Soft" biodegradable polymers preferably have a glass transition temperature of less than about −4° C., more preferably less than about −10° C., more especially preferably less than about −20° C., and most preferably less than about −30° C. In addition, "stiff" polymers tend to be more crystalline, while "soft" polymers are generally less crystalline and more amorphous, particularly at room temperature.

When a blend of soft and stiff biodegradable polymers is used to coat or impregnate a fibrous sheet, the relatively stiff biodegradable polymer may have a concentration in a range of about 20% to about 99% by weight of the blend of biodegradable polymers exclusive of the fibrous sheet and any fillers. The stiff biodegradable polymer preferably has a concentration of at least about 30% by weight of the polymer blend, more preferably at least about 40% by weight of the polymer blend, more especially preferably greater than, but not including, 50% by weight of the polymer blend, and most preferably greater than about 55% by weight of the polymer blend.

When a blend of soft and stiff biodegradable polymers is used to coat or impregnate a fibrous sheet, the relatively soft biodegradable polymer may have a concentration in a range of about 1% to about 80% by weight of the blend of biodegradable polymers. The soft biodegradable polymer preferably has a concentration up to about 70% by weight of the polymer blend, more preferably up to about 60% by weight of the polymer blend, more especially preferably less than, but not including, 50% by weight of the polymer blend, and most preferably up to about 45% by weight of the polymer blend.

Biodegradable polymers used to treat fibrous sheets within the scope of the present invention include, but are not limited to, synthetic polyesters, semi-synthetic polyesters made by fermentation (e.g., PHB and PHBV), polyesteramides, polycarbonates, and polyester urethanes. It is also within the scope of the invention to optionally include a variety of natural polymers and their derivatives, such as polymers comprising or derived from starch, cellulose, other polysaccharides and proteins. A single biodegradable polymer blended with an inorganic filler (e.g., silica or calcium carbonate) may also be used to treat a fibrous sheet in order to yield a treated sheet that is more heat resistant.

It is within the scope of the invention to incorporate inorganic and organic fillers in order to decrease self-adhesion, lower the cost, and increase the modulus of elasticity (Young's modulus) of biodegradable polymers used to treat fibrous sheets as well as the resulting sheets. Examples of inorganic fillers include calcium carbonate, titanium dioxide, silica, aluminum oxide, talc, mica, and the like. Examples of organic fillers include wood flour, ground seeds, cellulose particles, polymeric particles, ungelatinized starch granules, and the like. In addition, plasticizers may be used to impart desired softening and elongation properties.

In the case of fibrous sheets intended to be used as "wraps", such as wraps used to enclose meats, other perishable food items, and especially fast food items (e.g., sandwiches, burgers and dessert items), it may be desirable to provide wraps having good "dead-fold" properties so that once folded, wrapped or otherwise manipulated into a desired orientation, such wraps will tend to substantially maintain their orientation so as to not spontaneously unfold or unwrap, as occurs with a large number of plastic sheets and films (e.g., polyethylene). Dead-fold is a measure of the ability of a sheet or film to retain a crease, crinkle or other bend. It is measured independently of self cling, heat sealing, or the use of an adhesive to maintain a desired orientation.

Whereas the fibrous sheets themselves may impart or inherently possess dead-fold properties, polymers and polymer blends used to treat fibrous sheets may be engineered so as to have a relatively high Young's modulus, preferably at least about 100 MPa, more preferably at least about 150 MPa, and most preferably at least about 200 MPa. In general, increasing the concentration of the stiff biopolymer will tend to increase the Young's modulus and the resulting dead-fold properties. It should be understood, however, that Young's modulus only loosely correlates to dead-fold and does not, in every case, serve to define or predict the dead-fold properties of a sheet or film formed from a polymer or polymer blend.

Including particulate fillers within the polymer or polymer blend used to coat or impregnate a fibrous sheet is another way to increase dead-fold of the resulting sheet. When used to increase dead-fold, particulate fillers are typically included in an amount of at least about 5% by weight of the polymer or polymer blend, preferably at least about 10% by weight, more preferably at least about 15% by weight, more especially preferably at least about 20% by weight, and most preferably at least about 30% by weight of the polymer or polymer blend used to treat a fibrous sheet.

Yet another way to increase dead-fold is to increase the surface area, or "bulk hand feel", of treated sheets according to the invention. This may be accomplished, for example, by disrupting the generally smooth, planar nature of the treated sheet, e.g., by embossing, crimping, quilting or otherwise texturing the sheet so as to have regularly spaced-apart or random hills and valleys rather than simply being a perfectly smooth, planar sheet. A treated sheet may be textured, for example, by passing the sheet through a pair of knurled or other embossing-type rollers. Such texturing increases the ability of a treated sheet to take and maintain a fold, thus improving the dead-fold properties of the sheet.

The surface area of a treated sheet may also be increased by incorporating particulate fillers within the polymer or polymer blend used to coat or impregnate the fibrous sheet in order form surface irregularities within the surface of the treated sheet. This may be accomplished, for example, by incorporating filler particles, at least a portion of which, have a particle size diameter equal to or greater than the thickness of the polymer or polymer blend one or both sides of the treated sheet.

When used to wrap foods, or whenever good dead-fold properties are desired, treated sheets according to the invention can be engineered so as to have a dead-fold of at least about 50% (i.e., when creased using a standard dead-fold test, the sheets and films will maintain at least about 50% of their original crease). Preferably, the treated sheets will have a dead-fold of at least about 60%, more preferably at least about 70%, more especially preferably at least about 80%, and most especially preferably at least about 90%. Treated fibrous sheets according to the invention can have dead-fold approaching or equal to 100% (i.e., when folded such sheets remain folded absent the application of an external force sufficient to reverse the fold). By way of comparison, sheets and films made from polyethylene (e.g., for use in making sandwich or garbage bags) typically have a dead-fold of 0%.

In some cases, it may be desirable for treated sheets according to the invention to "breath". As set forth above, particulate fillers, both organic and inorganic, can be used to increase the modulus of elasticity and/or dead-fold. Such fillers can also advantageously create "cavitation" whenever sheets or films used to coat or impregnate fibrous sheets are stretched during processing. Cavitation occurs as the thermoplastic polymer fraction is pulled in either a monoaxial or biaxial direction and the filler particles create a discontinuity in the film or sheet that increases in size during stretching. In essence, a portion of the stretched polymer pulls away from the filler particles, resulting in tiny cavities in the vicinity of the filler particles. This, in turn, results in greatly increased breathability and vapor transmission of the sheets and films. The ability of inorganic filler particles to create cavitation increases as the particle size diameter approaches or exceeds the thickness of the polymer or polymer blend.

Another advantage of utilizing biodegradable polymers to treat fibrous sheets is that biopolymers are generally able to accept and retain print much more easily than conventional plastics or waxes used to treat papers. Many plastics and waxes are highly hydrophobic and must be surface oxidized in order to provide a chemically receptive surface to which ink can adhere. Biodegradable polymers, on the other hand, typically include a significant fraction of oxygen-containing moieties, such as ester, amide and/or urethane groups, to which inks can more readily adhere.

The treated sheets according to the invention may comprise single or multiple layers as desired. The fibrous sheets can be impregnated or coated on one or both sides, or any portion thereof. Multiple fibrous sheets can be joined or sandwiched together with one or more layers of biodegradable polymers, and optionally one or more auxiliary sheets (e.g., metals foils). Fibrous sheets may be coated or impregnated by film blowing, co-extrusion, casting, and coating techniques known in the art. In one embodiment, a thermoplastic biodegradable composition is heated to a molten state and then spread over a fibrous sheet using a doctor blade. In another embodiment, the thermoplastic biodegradable composition is sprayed onto the fibrous sheet. Thermoplastic biodegradable polymers used to treat fibrous sheets result in treated sheets that can be heat sealed to join two ends together to form sacks, pockets, pouches, and the like. They can be laminated onto existing sheets or substrates.

Notwithstanding the advantages of using biodegradable polymers and polymer blends compared to polyethylene or other non-biodegradable polymers, biodegradable polymers tend to have a much lower melt flow index (MFI) compared to non-biodegradable polymers such as polyethylene, which makes biodegradable polymers more difficult to spread or spray onto a fibrous sheet. It may therefore be advantageous to incorporate one or more of water, solvent, or plasticizer, and/or increase the temperature of the biodegradable polymer or polymer blend well above its softening temperature or range, but without burning or otherwise harming it, to increase its MFI so as to facilitate the coating or impregnating process.

In one preferred embodiment, 4–5 lb/1000 ft$^2$ (12–15 lb/3000 ft$^2$) tissue paper is treated with a biodegradable polymer blend to render it more resistant to penetration by liquids. Of course, it is certainly within the scope of the invention to utilize any weight paper or tissue paper, e.g., tissue paper ranging in weight from 8 lb/3000 ft$^2$ up to 60 lb/3000 ft$^2$. One of the benefits of coating or impregnating a fibrous sheet with a biodegradable polymer or polymer blend, as compared to simply making a sheet or film from the polymer blend itself, is that the fibrous sheet core increases the thermal stability of the resulting article of manufacture. This is beneficial in the case of wraps because increasing the thermal stability increases their ability to be microwaved without degrading or melting onto the food that is wrapped therein.

Increasing the amount of inorganic fillers within the biodegradable polymer or polymer blend used to coat or impregnate a fibrous sheet also increases the microwaveability of the resulting wraps. Providing biodegradable polymer wraps that are microwaveable is an improvement over wraps made using polyethylene, which are neither biodegradable nor microwave safe.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS

I. Introduction

Figure 1:
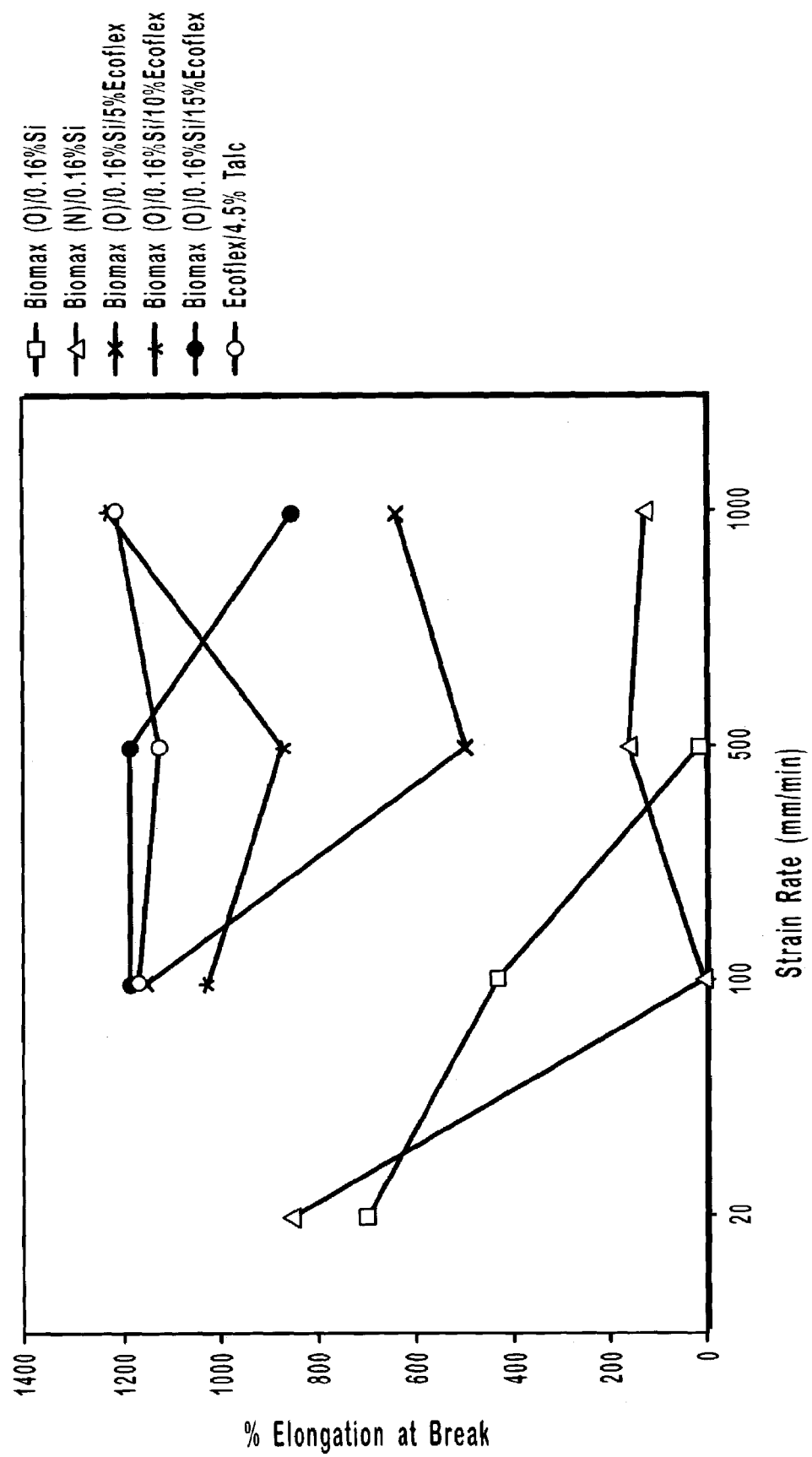
FIG. 1 is a plot of the percent elongation at break versus the applied strain rate for various neat and blended polymer films.

The invention relates to fibrous sheets that are coated or impregnated with inventive biodegradable polymers or polymer blends. The treated fibrous sheets according to the invention are in many ways superior to conventional plastics that suffer from their inability to degrade when discarded into the environment, that are not readily printable absent special treatment, and that generally have poor dead-fold properties. The treated sheets can be engineered to have improved strength, flexibility, elongation, temperature stability, microwaveability, processability, and dead-fold.

In one aspect of the invention, a biodegradable polymer blend used to treat fibrous sheets includes at least one biopolymer having relatively high stiffness and at least one biopolymer having relatively high flexibility. When blended together, it is possible to derive the beneficial properties from each polymer while offsetting or eliminating the negative properties of each polymer when used separately.

In another aspect of the invention, one or more biodegradable polymers used to coat a fibrous sheet are blended with a significant quantity of an inorganic filler in order to greatly increase the heat stability of the resulting treated sheet. Fibrous sheets themselves tend to have greater heat stability compared to sheets and films formed using biodegradable polymers. Adding an inorganic filler to the biodegradable polymer or polymer blend (e.g., in a concentration of at least about 30% by weight of the biodegradable polymer composition used to coat or impregnate the fibrous sheet) further increases the heat stability of treated sheets according to the invention. In the case of wraps used to protect food, such wraps can better withstand hot foods and being microwaved.

The treated sheets according to the invention are suitable for use as packaging materials, such as wraps, bags, pouches, coverings, laminate coatings, cartons, jugs, cups, plates, bowls, trays, platters, lids, straws, and the like.

Biodegradable polymers that may be used to treat fibrous sheets according to the present invention include, but are not limited to, synthetic polyesters, naturally derived polyesters, polyester amides, polycarbonates, and polyester urethanes, but may also include a variety of natural polymers and their derivatives, such as polymers and derivatives of starch, cellulose, other polysaccharides, and proteins. Particulate fillers, both organic and inorganic, may be incorporated into the polymers used to treat fibrous sheets to improve the dead-fold properties, increase bulk hand feel, create cavitation, reduce cost, and/or decrease self-adhesion of the treated sheets. Plasticizers may be added to impart desired softening and elongation properties. Treated fibrous sheets may optionally be embossed, crimped, quilted or otherwise textured to improve bulk hand feel and dead-fold. The biopolymers and biopolymer blends according to the invention more readily accept and retain print compared to conventional plastics or waxed papers because they typically include oxygen-containing moieties, such as ester, amide, or urethane groups, to which inks can readily adhere.

The terms "sheets" and "films" are to be understood as having their customary meanings as used in the thermoplastic and packaging arts Nevertheless, because the distinction between what constitutes a "sheet" and what constitutes a "film" largely turns on the thickness of the article of manufacture, the distinction is somewhat arbitrary (i.e. some articles may constitute both sheets and films). Because the biodegradable compositions according to the invention can be used to manufacture a wide variety of articles of manufacture, including articles useful to wrap, package or otherwise package food or other solid substrates, including sheets and films having a wide variety of thicknesses (both measured and calculated), it is not the intention of this disclosure to precisely distinguish, in all cases, between what may arguably constitute a "sheet" versus articles that may arguably constitute a "film". Therefore, when the present disclosure refers to "sheets and films" and "sheets or films", the intention is to designate the entire universe of articles of manufacture that may arguably constitute "sheets", "films" or both.

The terms "polymer blend" and "biodegradable polymer composition" includes two or more unfilled polymers and/or one or more polymers into which one or more types of solid fillers have been added.

The term "microwaveable" refers to biodegradable polymer compositions and treated sheets that can be placed together with food into a microwave oven and microwaved so as to heat the food without the composition melting or otherwise transferring from the treated sheet onto the food.

II. Treated Sheets

Treated sheets according to the invention include any fibrous sheet that has been coated or impregnated with a biodegradable polymer blend to render the fibrous sheet more resistant to liquids, such as water, oils or solvents. Specific examples of fibrous sheets and biodegradable polymer blends that may be used to manufacture treated sheets within the scope of the invention will now be discussed in greater detail.

A. Fibrous Sheets

It is within the scope of the invention to coat or impregnate various fibrous sheets known in the art. Examples include a wide variety of tissue papers, ordinary paper, paperboard, felts, wovens and nonwovens. In one embodiment, the fibrous sheet comprises a 12–15 lb/3000 ft$^2$ tissue paper. Coating or impregnating 12–15 lb/3000 ft$^2$ tissue paper yields treated sheets that are especially suitable for use as food wraps. It will be appreciated that it is within the scope of the invention to treat tissue papers and papers having a wide range of possible weights, e.g., from 8 lb/3000 ft$^2$ to 60 lb/3000 ft$^2$.

B. Biodegradable Polymers.

Biodegradable polymers that may be used within the scope of the present invention to coat or impregnate fibrous sheets include those which degrade through the action of living organisms, light, air, water and combinations of the foregoing. Such polymers include a range of synthetic polymers, such as polyesters, polyester amides, polycarbonates and the like. Naturally-derived semi-synthetic polyesters (e.g. from fermentation) can also be used. Biodegradation reactions are typically enzyme-catalyzed and generally occur in the presence of moisture. Natural macromolecules containing hydrolyzable linkages, such as protein, cellulose and starch, are generally susceptible to biodegradation by the hydrolytic enzymes of microorganisms. A few man-made polymers, however, are also biodegradable. The hydrophilic/hydrophobic character of polymers greatly affects their biodegradability, with more polar polymers being more readily biodegradable as a general rule. Other characteristics that affect polymer biodegradability include crystallinity, chain flexibility and chain length.

Besides being able to biodegrade, it is often important for a polymer or polymer blend to exhibit certain physical properties, such as stiffness, flexibility, water-resistance, oil-resistance, solvent resistance, strength, elongation, temperature stability, moisture vapor transmission, gas permeability, and/or dead-fold. The intended application of a particular treated fibrous sheet will often dictate which properties are necessary in order for a particular polymer, polymer blend, or treated sheet manufactured therefrom to exhibit the desired performance criteria. When used to form treated sheets suitable for use as packaging materials, desired performance criteria may include elongation, dead-fold, strength, printability, imperviousness to liquids, breathability, temperature stability, and the like.

Because of the limited number of biodegradable polymers, it is often difficult, or even impossible, to identify one single polymer or copolymer which meets all, or even most, of the desired performance criteria for a given application. This is particularly true in the area of packaging materials. Polymers that have a high glass transition temperature ($T_g$) are often difficult, if not impossible, to blow or cast into films on a mass scale. On the other hand, polymers that have a very low glass transition temperature typically have relatively low softening and/or melting points, which makes them difficult to mass produce into sheets and films without the tendency of blocking, or self adhesion. Moreover, such sheets and films may lack adequate strength, water vapor barrier properties, high temperature stability, and/or modulus to be suitable for certain applications, such as in the manufacture of wraps or laminates coatings.

In one aspect of the invention, it has been discovered that compositions suitable for coating or impregnating fibrous sheets can be obtained by blending one or more "stiff", or high glass transition temperature, polymers with one or more "soft", or low glass transition temperature, polymers. In another aspect of the invention, polymers or polymer blends can be filled with particulate fillers, and/or treated sheets or films made therefrom can be textured, in order to yield sheets having improved dead-fold properties.

Notwithstanding the benefits that can be derived from using a blend of stiff and soft polymers, particularly when extruding or blowing films or sheets used to coat fibrous sheets, it will be appreciated that there are coating methods that do not require the formation of an extruded or blown film or sheet, such as spreading using a doctor blade or spray coating. In such cases, it may not be necessary to use a polymer blend. It may be desirable, however, to use water, a solvent, or plasticizer to increase the MFI to facilitate the coating or impregnation process. It may be desirable to incorporate a significant quantity of an inorganic filler (e.g. silica or limestone) in order to increase the heat stability of the resulting treated sheet. In the case of a food wrap, increasing the heat stability increases the microwaveability of the treated sheet.

1. Stiff Polymers.

Even though the use of terms such as "stiff" and "soft" polymers may be somewhat arbitrary, such classifications are useful when determining which polymers to blend together in order to obtain a polymer blend having the desired performance criteria. In general, those polymers that may be characterized as being relatively "stiff", or less flexible, typically include polymers which have a glass transition temperature of at least about 10° C. Stiff polymers will preferably have a glass transition temperature of at least about 15° C., more preferably at least about 25° C., and most preferably at least about 35° C. The foregoing temperatures attempt to take into consideration the fact that the "glass transition temperature" is not always a discreet temperature but is often a range of temperatures within which the polymer changes from being a glassy and more brittle material to being a softer and more flexible material.

The glass transition temperature should be distinguished from the melting point of a polymer at or beyond which a thermoplastic polymer becomes plastic and deformable without significant rupture. Although there is often a positive correlation between a polymer's glass transition temperature ($T_g$) and its melting point ($T_m$), this is not strictly the case with all polymers. In some cases the difference between $T_g$ and $T_m$ may be large. In other cases it may be relatively small. It is generally the case, however, that the melting point of a stiffer polymer will typically be greater than the melting point of a softer polymer.

Preferred "stiff" polymers include, but are not limited to, modified polyethylene terephthalates (such as those manufactured by Du Pont), polyesteramides (such as those manufactured by Bayer), polylactic acid-based polymers (such as those manufactured by Cargill-Dow Polymers and Dianippon Ink), terpolymers based on polylactic acid, polyglycolic acid and polycaprolactone (such as those manufactured by Mitsui Chemicals), polyalkylene carbonates (such as polyethylene carbonate manufactured by PAC Polymers), and polyhydroxybutyrate (PHB).

A presently preferred stiff biopolymer includes a range of modified polyethylene terephthalate (PET) polymers manufactured by DuPont, and sold under the trade name BIOMAX. Various modified PET polymers of DuPont are described in greater detail in U.S. Pat. No. 5,053,482 to Tietz, U.S. Pat. No. 5,097,004 to Gallagher et al., U.S. Pat. No. 5,097,005 to Tietz, U.S. Pat. No. 5,171,308 to Gallagher et al., U.S. Pat. No. 5,219,646, to Gallagher et al., and U.S. Pat. No. 5,295,985 to Romesser et al. For purposes of disclosing "stiff" polymers, the foregoing patents are disclosed herein by reference.

In general, the modified PET polymers of DuPont may be characterized as comprising alternating units of a terephthalate constituent and an aliphatic constituent, with the aliphatic constituent comprising a statistical distribution of two or more different aliphatic units derived from two or more different diols, such as ethylene glycol, diethylene glycol, triethylene oxide, polyethylene glycol, lower alkane diols, both branched and unbranched, and derivatives of the foregoing. A portion of the aliphatic units may also be derived from an aliphatic diacid, such as adipic acid. In addition, a fraction of the phenylene groups within the repeating terephthalate units may be sulfonated and neutralized with an alkali metal or alkaline earth metal base. Both the aliphatic portion of the modified PET polymer as well as the statistically significant quantity of sulfonated terephthalate units contribute significantly to the biodegradability of the BIOMAX polymer.

Some BIOMAX grades of polymers have a melting point of 200–208° C. and a glass transition temperature of 40–60° C. BIOMAX 6926 is one such grade. It is a relatively strong and stiff polymer that, when blended with a softer polymer, yields a mixture that can readily be formed into sheets and films. In addition, or in the alternative, one or more particulate fillers may be included in order to impart desired properties described more fully herein.

In general, modified polyethylene terephthalates that would be expected to have properties suitable for use as a "stiff" biodegradable polymer consist essentially of recurring structural units having the following general formula:

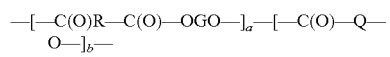

wherein up to about 40 mole % of R is selected from the group consisting of a chemical bond and one or more divalent, non-aromatic, $C_1$–$C_{10}$ hydrocarbylene radicals, and the remainder of R is at least about 85% mole % p-phenylene radical, wherein G includes from 0 to about 30 mole % of a polyethylene ether radical selected from the group consisting of:

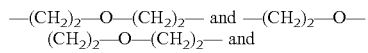
—(CH$_2$)$_2$—O—(CH$_2$)$_2$— and —(CH$_2$)$_2$—O—(CH$_2$)$_2$—O—(CH$_2$)$_2$— and the remainder of G is selected from the group consisting of polyalkylene ether radicals of molecular weight at least about 250 (number average), and —(CH$_2$)$_2$—, —(CH$_2$)$_3$—, and —(CH$_2$)$_4$— radicals, wherein Q is derived from a hydroxy acid of the formula:

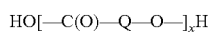
HO[—C(O)—Q—O—]$_x$H wherein x is an integer and such hydroxy acids have a melting point at least 5° C. below their decomposition temperature, and Q is selected from the group consisting of a chemical bond and hydrocarbylene radicals —(CH$_2$)$_n$—, where n is an integer from 1 to 5, —C(R')H—, and —C(R')HCH$_2$—, wherein R' is selected from the group consisting of —CH$_3$ and —CH$_2$CH$_3$, and wherein "a" and "b" are mole fractions of the polymer, and the mole fraction "a" may be 0.6 to 1 and, correspondingly, mole fraction "b" may be 0 to 0.4, and wherein about 0.1 to about 15 mole %, preferably about 0.1 to about 2.5 mole %, of the polymer contains alkali metal or alkaline earth metal sulfo groups, especially about 1.5 to about 2 mole % of such groups.

Another stiff biopolymer that may be used in manufacturing polymer blends according to the present invention includes polylactic acid (PLA). Polylactic acid typically has a glass transition temperature of about 59° C. and a melting point of about 178° C. PLA has low elongation and is quite hard. It is a strong thermoplastic material that can be injection molded, extruded, cast, thermoformed, or used as spun or melt-blown fibers to produce nonwoven goods.

Polymers based on or including PLA first found commercial application as medical sutures in 1970. High polymers of lactic acid ($M_n$=50,000–110,000) are strong thermoplastics that can be fabricated into useful products that can be broken down by common soil bacteria. Potential applications of PLA include paper coatings for packaging (food and beverage cartons), plastic foam for fast foods, microwavable containers, and other consumer products such as disposable diapers or yard waste bags. PLA can be a homopolymer or it may be copolymerized with glycolides, lactones or other monomers. One particularly attractive feature of PLA-based polymers is that they are derived from renewable agricultural products.

Because lactic acid is difficult to polymerize directly to high polymers in a single step on a commercial scale, most companies employ a two-step process. Lactic acid is first oligomerized to a linear chain with a molecular weight of less than 3000 by removing water. The oligomer is then depolymerized to lactide, which is a cyclic dimer consisting of two condensed lactic acid molecules. This six-member ring is purified and subjected to ring opening polymerization to produce polylactic acid with a molecular weight of 50,000–110,000.

Because lactic acid has an asymmetric carbon atom, it exists in several isomeric forms. The lactic acid most commonly sold commercially contains equal parts of L-(+)-lactic acid and D-(−)-lactic acid and is therefore optically inactive, with no rotatory power. The racemic mixture is called DL-lactic acid.

Another stiff polymer that may be used within the inventive polymer blends is known as CPLA, which is a derivative of PLA and is sold by Dianippon Ink. Two classes of CPLA are sold and are referred to as "CPLA hard" and "CPLA soft", both of which comprise "stiff polymers", as that term has been defined herein. CPLA hard has a glass transition temperature of 60° C., while CPLA soft has a glass transition temperature of 51° C.

Bayer corporation manufactures polyesteramides sold under the name BAK. Polyester amides manufactured by Bayer are described more fully in U.S. Pat. No. 5,644,020 to Timmermann et al. For purposes of disclosing biodegradable polymers, at least some of which constitute "stiff" polymers, the foregoing patent is incorporated herein by reference. One form of BAK is prepared from adipic acid, 1,4-butanediol, and 6-aminocaproic acid. BAK 1095, a polyesteramide having an $M_n$ of 22,700 and an $M_w$ of 69,700 and which contains aromatic constituents, has a melting point of 125° C. BAK 2195 has a melting point of 175° C. Although the glass transition temperatures of BAK 1095 and BAK 2195 are difficult to measure, because BAK appears to behave like a stiff polymer in the sense that improved properties may be obtained by blending BAK with a soft polymer, the inventors believe that the glass transition temperature of BAK polymers is essentially at least about 10° C. For purposes of understanding the meaning and scope of the specification and claims, polyester amides such as BAK, as well as others that behave like BAK and can be used as a "stiff" polymer, shall be deemed to have a glass temperature of at least about 10° C.

Mitsui Chemicals, Inc. manufactures a terpolymer that includes units derived from polylactide, polyglycolide and polycaprolactone that have been condensed together. Thus, this polymer is an aliphatic polymer and may be characterized as a PLA/PGA/PCL terpolymer. Three grade of this polymer are available, H100J, S100 and T100. The H100J grade PLA/PGA/PCL terpolymer has been analyzed to have a glass transition temperatures of 74° C. and a melting point of 173° C.

PAC Polymers Inc. manufactures polyethylene carbonate (PEC) having a glass transition temperature range of 10–28° C. PEC is a "stiff" polymer for purposes of the present invention.

Polyhydroxybutyrates (PHBs) can act as either a stiff or soft polymer depending on their molecular weight, whether they have been modified using chain extenders and/or branching agents, whether they have been copolymerized with another polymer, and depending on the other constituents within the overall thermoplastic composition. In this sense, PHBs are unique among biopolymers and may be of special interest for use in making wraps, laminate coatings, packaging materials, and the like.

As discussed more fully below, native or dried gelatinized starch can be used as particulate fillers in order to increase the dead-fold properties of sheets and films made from a particular polymer or polymer blend. However, to the extent that starches become thermoplastic but retain a substantially portion of their crystallinity, such starches may act as "stiff", rather than "soft", polymers.

2. Soft Polymers.

In general, those biopolymers that may be characterized as being "soft", or less rigid, typically include polymers which have a glass transition temperature of less than about 0° C. Soft biopolymers within the scope of the invention will typically have a glass transition temperature of less than about 0° C., preferably less than about −4° C., more preferably less than about −10° C., more especially preferably less than about −20° C., and most preferably less than about −30° C. The foregoing temperatures attempt to take into consideration the fact that the "glass transition temperatures" of "soft" polymers are not always discreet temperatures but often comprise a range of temperatures.

Preferred "soft" biopolymers within the scope of the present invention include, but are not limited to, aliphatic-aromatic copolyesters (such as those manufactured by BASF and Eastman Chemical), aliphatic polyesters which include repeating units having at least 5 carbon atoms, e.g., polyhydroxyvalerate, polyhydroxybutyrate-hydroxyvalerate copolymer and polycaprolactone (such as those manufactured by Daicel Chemical, Monsanto, Solvay, and Union Carbide), and succinate-based aliphatic polymers, e.g., polybutylene succinate (PBS), polybutylene succinate adipate (PBSA), and polyethylene succinate (PES) (such as those manufactured by Showa High Polymer).

U.S. Pat. Nos. 5,817,721, 5,863,991, 5,880,220, 5,889,135, 5,936,045, 6,018,004, 6,046,248, 6,111,058, 6,114,042, 6,201,034, 6,258,924, 6,297,347, 6,303,677, 6,353,084, all to Warzelhan et al., and assigned to BASF, disclose a range of aliphatic-aromatic copolyesters within the scope of the invention, as do U.S. Pat. No. 6,103,058 to Yamamoto et al. and U.S. Pat. No. 6,120,895 to Kowitz et al. Similarly, U.S. Pat. Nos. 5,292,783, 5,446,079, 5,559,171, 5,580,911, 5,599,858 and 5,900,322, all to Buchanan et al. and assigned to Eastman Chemical, as well as U.S. Pat. Nos. 6,020,393 and 6,922,829 to Khemani, also assigned to Eastman Chemical, disclose aliphatic-aromatic copolyesters within the scope of the invention. For purposes of disclosing "soft" polymers, the foregoing patents are incorporated herein by reference.

A preferred "soft" polymer that may be used in the manufacture of polymer blends includes aliphatic-aromatic copolyesters manufactured by BASF and sold under the trade name ECOFLEX. The aliphatic-aromatic copolyesters manufactured by BASF comprise a statistical copolyester derived from 1,4-butanediol, adipic acid, and dimethylterephthalate (DMT). In some cases, a diisocyanate is used as a chain lengthener. Branching agents may also be used to yield branched, rather than linear, copolymers.

Copolymerization of aliphatic monomers, such as diols and diacids, with aromatic monomers, such as diols and diacids (e.g., terephthalic acid or diester derivatives such as DMT), is one way to improve the performance properties of aliphatic polyesters. However, questions have been raised within the industry regarding the complete biodegradability of aliphatic-aromatic copolyesters because aromatic copolyesters such as PET are known to be resistant to microbial attack. Nevertheless, researchers have discovered that aliphatic-aromatic copolyesters are indeed biodegradable and that the biodegradability of these copolyesters is related to the length of the aromatic sequence. Block copolyesters with relatively long aromatic sequences are less rapidly degraded by microorganisms compared to random copolyesters having more interrupted aromatic sequences. Film thickness is also a factor, with thicker films degrading more slowly due to their reduced surface to volume ratio than thinner films, all things being equal. The polymer presently sold under the name ECOFLEX S BX 7000 by BASF has a glass transition temperature of −33° C. and a melting range of 105–115° C.

Another "soft" aliphatic-aromatic copolyester is manufactured by Eastman Chemical Company and is sold under the trade name EASTAR BIO. The aliphatic-aromatic copolyester manufactured by Eastman is a random copolymer derived from 1,4-butanediol, adipic acid, and dimethylterephthalate (DMT). One particular grade of EASTAR BIO, known as EASTAR BIO 14766, has a glass transition temperature of −33° C. and a melting point of 112° C. It has a tensile strength at break in the machine direction of 19 MPa, an elongation at break of 600%, and a tensile modulus of elasticity of 97 MPa (tangent). It has an Elmendorf tear strength of 282 g.

Polycaprolactone (PCL) is a biodegradable aliphatic polyester having a relatively low melting point and a very low glass transition temperature. It is so named because it is formed by polymerizing ϵ-caprolactone. The glass transition temperature of PCL is −60° C. and the melting point is only 60° C. Because of this PCL and other similar aliphatic polyesters with low melting points are difficult to process by conventional techniques such as film blowing and blow molding. Films made from PCL are tacky as extruded and have low melt strength over 130° C. Also, the slow crystallization of this polymer causes the properties to change over time. Blending PCL with other polymers improves the processability of PCL. One common PCL is TONE, manufactured by Union Carbide. Other manufactures of PCL include Daicel Chemical, Ltd. and Solvay. Though the use of PCL is certainly within the scope of the invention, it is currently a less preferred soft biopolymer than aliphatic-aromatic polyesters, which give overall better performance.

ϵ-Caprolactone is a seven member ring compound that is characterized by its reactivity. Cleavage usually takes place at the carbonyl group. ϵ-Caprolactone is typically made from cyclohexanone by a peroxidation process. PCL is a polyester made by polymerizing ϵ-caprolactone. Higher molecular weight PCL may be prepared under the influence of a wide variety of catalysts, such as aluminum alkyls, organometallic compositions, such as Group Ia, IIa, IIb, or IIIa metal alkyls, Grignard reagents, Group II metal dialkyls, calcium or other metal amides or alkyl amides, reaction products of alkaline earth hexamoniates, alkaline oxides and acetonitrile, aluminum trialkoxides, alkaline earth aluminum or boron hydrides, alkaline metal or alkaline earth hydrides or alkaline metals alone. PCL is typically prepared by initiation with an aliphatic diol (HO—R—OH), which forms a terminal end group.

Another "soft" aliphatic polyester that may be used in manufacturing the inventive polymer blends is polyhydroxybutyrate-hydroxyvalerate copolymer (PHBV), which is manufactured using a microbial-induced fermentation process. One such PHBV copolyester, manufactured by the Monsanto Company, has a glass transition temperature of about 0° C. and a melting point of about 170° C. If possible, PHBV copolyesters should be formulated and/or modified so as have a glass transition temperature less than about −5° C.

In the fermentation process used to manufacture PHBV, a single bacterium species converts corn and potato feed stocks into a copolymer of polyhydroxybutyrate and hydroxyvalerate constituents. By manipulating the feed stocks, the proportions of the two polymer segments can be varied to make different grades of material. All grades are moisture resistant while still being fully biodegradable. The world producers of PHBV are Monsanto, with its BIOPOL product, and METABOLIX, with its various grades of polyhydroxy-alkanoates (PHAs). Polyhydroxyvalerate (PHV) is also an example of a "soft" polymer.

As set forth above, polyhydroxybutyrates (PHBs) can act as either a stiff or soft polymer depending on their molecular weight, whether they have been modified using chain extenders and/or branching agents, whether they have been copolymerized with another polymer, and depending on the other constituents within the overall thermoplastic composition. In this sense, PHBs are unique among biopolymers and may be of special interest for use in making wraps, laminate coatings, packaging materials, and the like.

Another class of "soft" aliphatic polyesters are based on repeating succinate units such as polybutylene succinate (PBS), polybutylene succinate adipate (PBSA), and polyethylene succinate (PES). Each of these succinate-based aliphatic polyesters are manufactured by Showa High Polymer, Ltd. and are sold under the trade name BIONELLE. PBS (Bionolle 1001) has a glass transition temperature of −30° C. and a melting point of 114° C. PBSA (Bionolle 3001) has a glass transition temperature of −35° C. and a melting point of 95° C. PES (Bionolle 6000) has a glass transition temperature of −4° C. and a melting point of 102°.

The target applications for BIONOLLE include films, sheets, filaments, foam-molded products and foam-expanded products. BIONOLLE is biodegradable in compost, in moist soil, in water with activated sludge, and in sea water. PBSA degrades rapidly in a compost environment, so it is similar to cellulose, whereas PBS degrades less rapidly and is similar to newspaper in terms of biodegradation.

BIONOLLE is manufactured according to a patented two-step process of preparing succinate aliphatic polyesters with high molecular weights and useful physical properties. In a first step, a low molecular weight hydroxy-terminated aliphatic polyester prepolymer is made from a glycol and an aliphatic dicarboxylic acid. This polymerization is catalyzed by a titanium catalyst such as tetraisopropyltitanate, tetraisopropoxy titanium, dibutoxydiacetoacetoxy titanium, or tetrabutyltitanate. In the second step, a high molecular weight polyester is made by reacting a diisocyanate, such as hexamethylene diisocyante (HMDI) with a polyester prepolymer.

Showa manufactures PBS by first reacting 1,4-butanediol with succinic acid in a condensation reaction to form a prepolymer and then reacting the prepolymer with HMDI as a chain extender.

PBSA copolymer is manufactured by first condensing 1,4-butanediol, succinic acid and adipic acid to form a prepolymer and then reacting the prepolymer with HMDI as a chain extender.

PES homopolymer is prepared by reacting ethylene glycol and succinic acid and using HMDI or diphenylmethane diisocyanate as a chain extender.

Succinate-based aliphatic polyesters are also manufactured by Mitsui Toatsu, Nippon Shokubai, Cheil Synthetics, Eastman Chemical, and Sunkyon Industries.

Finally, although starch, such as modified starch or starch that has been gelatinized with water and subsequently dried, is known to have a high glass transition temperature (i.e., 70–85° C.) and be very crystalline at room temperature, certain forms of starch in which the crystallinity has been greatly reduced or destroyed altogether can have very low glass transition temperatures and may, in fact, constitute "soft" biodegradable polymers within the scope of the invention. As discussed more fully below, native or dried gelatinized starch can be used as particulate fillers in order to increase the dead-fold properties of sheets and films made from a particular polymer or polymer blend. Moreover, to the extent that starches become thermoplastic but retain a substantially portion of their crystallinity, such starches may act as "stiff", rather than "soft", polymers. Nevertheless, there exists a range of thermoplastic starch polymers that can behave as "soft" polymers.

For example, U.S. Pat. No. 5,362,777 to Tomka is a landmark patent and was the first attempt to manufacture what is known as thermoplastically processable starch (TPS). TPS is characterized as a thermoplastic starch polymer formed by mixing and heating native or modified starch in the presence of an appropriate high boiling plasticizer (such as glycerin and sorbitol) in a manner such that the starch has little or no crystallinity, a low glass transition temperature, and very low water (less than 5%, preferably less than about 1% by weight while in a melted state after venting and prior to conditioning). When blended with appropriate hydrophobic polymers, such as the stiff polymers disclosed herein, e.g., polyesteramides such as BAK, TPS can have a glass transition temperature as low as −60° C., and typically below about −20° C.

Although it is within the scope of the invention to include thermoplastic polymers based on starch that include plasticizers such as glycerine, sorbitol, propylene glycol and the like, it is preferable, when manufacturing packaging materials that will come into contact with food products, to utilize thermoplastic starch polymers that are made without the use of such plasticizers, which can potentially diffuse into food. Preferred thermoplastic starch polymers for use in making food wraps may advantageously utilize the natural water content of native starch granules to initially break down the granular structure and melt the native starch. Thereafter, the melted starch can be blended with one or more synthetic biopolymers, and the mixture dried by venting, in order to yield a final polymer blend. Where it is desired to make food wraps or other sheets or films intended to contact food using a thermoplastic starch polymer made with a high boiling liquid plasticizer, it will be preferable to limit the quantity of such thermoplastic starch polymers to less than 10% by weight of the polymer mixture, exclusive of any solid fillers.

C. Other Components.

There are a number of optional components which may be included within the biodegradable polymer blends in order to impart desired properties. These include, but are not limited to, plasticizers, lubricants, fillers, natural polymers and nonbiodegradable polymers.

1. Plasticizers and Lubricants.

Plasticizers and lubricants may optionally be added in order to improve processing, such as extrusion, film blowing, spreading or spraying, or final mechanical properties, particularly of polymer blends that are relatively stiff. A stiffer polymer blend may be dictated by other performance criteria, such as high temperature stability, strength, lower elongation, higher dead-fold, resistance to "blocking" during and after processing, and the like. In such cases, a plasticizer may allow the polymer blend to satisfy certain processing and/or performance criteria.

In the case where a biodegradable polymer or polymer blend is spread or sprayed onto a fibrous sheet, it may be advantageous to use a plasticizer to increase the melt flow index (MFI) of the molten polymer or polymer blend. Increasing the MFI of a molten polymer or polymer blend facilitates high speed coating. In general, when certain biodegradable polymers are heated to above their softening point, they have an MFI between about 2–10 g/10 min. Increasing the MFI preferably to at least about 40 g/10 min., more preferably to at least about 70 g/10 min., and most preferably to at least about 100 g/10 min. greatly facilitates spreading or spraying a molten biodegradable polymer blend.

Suitable plasticizers within the scope of the invention, particularly when incorporated into a polymer blend that is intended to be used in the manufacture of wraps and other packaging materials that will come into contact with food, will preferably be safe if consumed, at least in smaller quantities.

Exemplary plasticizers that may be used in accordance with the present invention include, but are not limited to, soybean oil, caster oil, TWEEN 20, TWEEN 40, TWEEN 60, TWEEN 80, TWEEN 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bis-oleamide, polymeric plasticizers such as poly(1,6-hexamethylene adipate), and other compatible low molecular weight polymers.

Examples of lubricants include salts of fatty acids, an example of which is magnesium stearate.

Volatile plasticizers that can be removed during or after the coating process, such as water or volatile solvents, may be used to facilitate high speed coating. Examples of volatile solvents that may be used, preferably by recovering and reusing such solvents, include, but are not limited to, chloroform, methylene chloride, other chlorinated hydrocarbons, ethyl alcohol, isopropyl alcohol, other alcohols, acetone, methyl ethyl ketone, other ketones, and the like.

It has been found, for example, that including 200 ppm water increases the MFI of a molten biodegradable polymer composition from 4 g/10 min. to about 40 g/10 min. Whereas many of the biodegradable polymers described herein are "hydrophobic" in the sense that they do not dissolve or degrade when exposed to water at room temperature, they do contain polar moieties that greatly increase the affinity of such polymers for water while heated to a molten state. Thus, it is possible to blend some amount of water within molten a biodegradable polymer that would otherwise be hydrophobic when cooled to room temperature.

2. Solid Fillers.

Particulate fillers may optionally be added for a number of reasons, including but not limited to, increasing the Young's modulus, dead-fold properties, rigidity, breathability, thermal stability, microwaveability, and insulating ability, and for decreasing the cost and tendency of the polymer blend to "block" or self-adhere during processing. Other fillers, like fibers having a high aspect ratio, may increase the strength, fracture energy and dead-fold properties of the sheets and films according to the invention. In general, fillers within the scope of the invention will generally fall within three classes or categories: (1) inorganic particulate fillers, (2) fibers and (3) organic fillers.

a. Inorganic Particulate Fillers

The terms "particle" or "particulate filler" should be broadly interpreted to include filler particles having any of a variety of different shapes and aspect ratios. In general, "particles" are those solids having an aspect ratio (i.e., the ratio of length to thickness) of less than about 10:1. Solids having an aspect ratio greater than about 10:1 may be better understood as "fibers", as that term will be defined and discussed hereinbelow.

Virtually any known filler, whether inert or reactive, can be incorporated into the biodegradable polymer blends. In general, adding an inorganic filler will tend to reduce the cost of the resulting polymer blend. If a relatively small amount of inorganic filler is used, the effects on the properties of the final composition are minimized, while adding a relatively large amount of inorganic filler will increase those effects. In those cases where adding the inorganic filler will tend to detract from a critical physical parameter, such as tensile strength or flexibility, only so much of the filler should be added in order to reduce the cost of the resulting composition, while retaining adequate mechanical properties required by the intended use. However, in those cases where adding the inorganic filler will improve one or more desired physical properties of a given application, such as stiffness, compressive strength, dead-fold, heat resistance, microwaveability, insulating ability, and/or breathability, it may be desirable to increase the quantity of added filler in order to provide this desired property while also proving greatly decreased cost.

It will be appreciated that one of ordinary skill in the art, using a microstructural engineering approach, can select the types and amount of the various inorganic fillers that may be included within the polymer blend in order to engineer a final material having the desired properties while taking advantage of the cost-reducing properties of adding the inorganic filler.

In general, in order to maximize the quantity of inorganic filler while minimizing the deleterious mechanical effects of adding the filler as much as possible, it may be advantageous to select filler particles in a manner that decreases the specific surface area of the particles. The specific surface area is defined as the ratio of the total particle surface area versus the total particle volume. One way to decrease the specific surface area is to select particles that have a more uniform surface geometry. The more jagged and irregular the particle surface geometry, the greater will be the ratio of surface area to volume of that particle. Another way to decrease the specific surface area is to increase the particle size. In view of the advantages of decreasing the specific surface area of the inorganic filler, it will be preferable to include inorganic filler particles having a specific surface area in a range from about 0.1 $m^2/g$ to about 400 $m^2/g$, more preferably in range from about 0.15 $m^2/g$ to about 50 $m^2/g$, and most preferably in a range from about 0.2 $m^2/g$ to about 2 $m^2/g$.

Related to decreased specific surface area in improving the rheology and final strength properties of the polymer blends of the present invention is the concept of particle packing. Particle packing techniques allow for a reduction in "wasted" interstitial space between particles while maintaining adequate particle lubrication and, hence, mixture rheology, within the melted polymer blend, while also allowing for more efficient use of the thermoplastic phase as a binder in the final hardened polymer blends of the present invention. Simply stated, particle packing is the process of selecting one or more ranges of particle sizes in order that the spaces between larger particles are substantially occupied by a selected group of smaller particles.

In order to optimize the packing density of the inorganic filler particles, differently sized particles having sizes ranging from as small as about 0.01 micron to as large as about 2 mm may be used. Of course, the thickness and other physical parameters of the desired article to be manufactured from any given polymer blend may often dictate the upper particle size limit. In general, the particle packing will be increased whenever any given set of particles is mixed with another set of particles having an average particle size (i.e., width and/or length) that is at least about 2 times bigger or smaller than the average particle size of the first group of particles. The particle packing density for a two-particle system will be maximized whenever the size ratio of a given set of particles is from about 3–10 times the size of another set of particles. Similarly, three or more different sets of particles may be used to further increase the particle packing density.

The degree of packing density that will be "optimal" will depend on a number of factors including, but not limited to, the types and concentrations of the various components within both the thermoplastic phase and the solid filler phase, the shaping method that will be employed, and the desired mechanical and other performance properties of the final articles to be manufactured from a given polymer blend. One of ordinary skill in the art will be able to determine the optimal level of particle packing that will optimize the packing density through routine testing. A more detailed discussion of particle packing techniques can be found in U.S. Pat. No. 5,527,387 to Andersen et al. For purposes of disclosing particle packing techniques that may be useful in maximizing or optimizing particle packing density, the foregoing patent is incorporated herein by reference.

In those cases where it is desired to take advantage of the improved properties of rheology and binding efficiency utilizing particle packing techniques, it will be preferable to include inorganic filler particles having a natural particle packing density in a range from about 0.55 to about 0.95, more preferably in range from about 0.6 to about 0.9, and most preferably in a range from about 0.7 to about 0.85.

Examples of useful inorganic fillers that may be included within the biodegradable polymer blends include such disparate materials as sand, gravel, crushed rock, bauxite, granite, limestone, sandstone, glass beads, aerogels, xerogels, mica, clay, alumina, silica, kaolin, microspheres, hollow glass spheres, porous ceramic spheres, gypsum dihydrate, insoluble salts, calcium carbonate, magnesium carbonate, calcium hydroxide, calcium aluminate, magnesium carbonate, titanium dioxide, talc, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and other geologic materials. A wide variety of other inorganic fillers may be added to the polymer blends, including materials such as metals and metal alloys (e.g., stainless steel, iron, and copper), balls or hollow spherical materials (such as glass, polymers, and metals), filings, pellets, flakes and powders (such as microsilica).

The particle size or range of particle sizes of the inorganic fillers will depend on the wall thickness of the film, sheet, or other article that is to be manufactured from the polymer blend. In general, the larger the wall thickness, the larger will be the acceptable particle size. In most cases, it will be preferable to maximize the particle size within the acceptable range of particle sizes for a given application in order to reduce the cost and specific surface area of the inorganic filler. For films that are intended to have a substantial amount of flexibility, tensile strength, bending endurance and relatively low dead-fold and breathability (e.g., plastic bags) the particle size diameter of the inorganic filler will preferably be less than about 20% of the wall thickness of the film. For example, for a film or sheet having a thickness of 40 microns, it may be preferable for the inorganic filler particles to have a particle size diameter of about 8 microns or less.

On the other hand, it may be desirable in some cases for at least a portion of the filler particles to have a larger particle size diameter, such as a diameter that is equal to or greater than the thickness of the polymeric sheet or film. Utilizing filler particles whose diameters equal or exceed the thickness of the polymeric sheet or film disrupts the surface of the sheet or film and increases the surface area, which can advantageously increase the bulk-hand-feel and/or dead-fold properties of the sheet or film. In the case where the sheets or films are mono or biaxial stretched, the use of larger filler particles (e.g., larger than 20% of the wall thickness of the film) creates definitive discontinuities that yield sheets and films having a high degree of cavitation. Cavitation results in sheets having a touch and feel that more closely resembles the touch and feel of paper. In addition, it greatly increases the breathability and water vapor transmission of the sheets and films.

The amount of particulate filler added to a polymer blend will depend on a variety of factors, including the quantity and identities of the other added components, as well as the specific surface area, packing density, and/or size distribution of the filler particles themselves. Accordingly, the concentration of particulate filler within the polymer blends may be included in a broad range from as low as 0% by volume to as high as about 90% by volume of the polymer blend. Because of the variations in density of the various inorganic fillers than can be used, it may be more correct in some instances to express the concentration of the inorganic filler in terms of weight percent rather than volume percent. In view of this, the inorganic filler components can be included within a broad range from as low as 0% by weight to as high as 95% by weight of the polymer blend, preferably in a range from about 5% to about 90% by weight.

In those cases where it is desired for the properties of the thermoplastic phase to predominate due to the required performance criteria of the articles being manufactured, the inorganic filler will preferably be included in an amount in a range from about 5% to about 50% by volume of polymer blend. On the other hand, where it is desired to create highly inorganically filled systems, the inorganic filler will preferably be included in an amount in a range from about 50% to about 90% by volume.

In light of these competing objectives, the actual preferred quantity of inorganic filler may vary widely. In general terms, however, in order to appreciably decrease the cost of the resulting polymer blend and/or to impart increased dead-fold, heat-resistance, insulation ability, and/or microwaveability, the inorganic filler component will typically be included in an amount of at least about 10% by weight of the overall composition, preferably at least about 15% by weight, more preferably at least about 20% by weight, more especially preferably at least about 30% by weight, and most preferably at least about 35% by weight of the overall composition.

b. Discrete Fibers

In addition to the fibrous sheet being treated, discrete fibers can optionally be used in order to improve the physical properties of the polymer blends. Like the aforementioned fillers, fibers will typically constitute a solid phase that is separate and distinct from the thermoplastic phase. However, because of the shape of fibers, i.e., by having an aspect ratio greater than at least about 10:1, they are better able to impart strength and toughness than particulate fillers. As used in the specification and the appended claims, the terms "fibers" and "fibrous material" include both inorganic fibers and organic fibers. Fibers may be added to the moldable mixture to increase the flexibility, ductility, bendability, cohesion, elongation ability, deflection ability, toughness, dead-fold, and fracture energy, as well as the flexural and tensile strengths of the resulting sheets and articles.

Fibers that may be incorporated into the polymer blends include naturally occurring organic fibers, such as cellulosic fibers extracted from wood, plant leaves, and plant stems. In addition, inorganic fibers made from glass, graphite, silica, ceramic, rock wool, or metal materials may also be used. Preferred fibers include cotton, wood fibers (both hardwood or softwood fibers, examples of which include southern hardwood and southern pine), flax, abaca, sisal, ramie, hemp, and bagasse because they readily decompose under normal conditions. Even recycled paper fibers can be used in many cases and are extremely inexpensive and plentiful.

The fibers used in making the sheets and other articles of the present invention preferably have a high length to width ratio (or "aspect ratio") because longer, narrower fibers can impart more strength to the polymer blend while adding significantly less bulk and mass to the matrix than thicker fibers. The fibers will have an aspect ratio of at least about 10:1, preferably greater than about 25:1, more preferably greater than about 50:1, and most preferably greater than about 100:1.

The amount of fibers added to the polymer blends will vary depending upon the desired properties of the finished article of manufacture, with tensile strength, toughness, flexibility, and cost being the principle criteria for determining the amount of fiber to be added in any mix design. Accordingly, the concentration of fibers within the polymer blends of the present invention can be included in a broad range from 0% to about 90% by weight of the polymer blend. If included at all, fibers will preferably be included in an amount in a range from about 1% to about 80% by weight of the polymer blend, more preferably in a range from about 3% to about 50% by weight, and most preferably in a range from about 5% to about 30% by weight of the polymer blend.

c. Organic Fillers

The polymer blends may also include a wide range of organic fillers. Depending on the melting points of the polymer blend and organic filler being added, the organic filler may remain as a discrete particle and constitute a solid phase separate from the thermoplastic phase, or it may partially or wholly melt and become partially or wholly associated with the thermoplastic phase.

Organic fillers may comprise a wide variety of natural occurring organic fillers such as, for example, seagel, cork, seeds, gelatins, wood flour, saw dust, milled polymeric materials, agar-based materials, native starch granules, pregelatinized and dried starch, expandable particles, and the like. Organic fillers may also include one or more synthetic polymers of which there is virtually endless variety. Because of the diverse nature of organic fillers, there will not generally be a preferred concentration range for the optional organic filler component.

Organic fillers can partially or wholly take the place of inorganic fillers. In some cases, organic fillers can be selected that will impart the same properties as inorganic fillers, such as to increase dead-fold, the bulk hand feel, breathability and water vapor transmission. When included at all, the organic filler component will typically be included in an amount of at least about 5% by weight of the overall composition, preferably at least about 10% by weight, more preferably at least about 20% by weight, and more especially preferably at least about 30% by weight, and most preferably at least about 35% by weight of the overall composition.

3. Natural Polymers.

In addition to thermoplastic starch or starch particles, other natural polymers that may be used within the polymer blends comprise or are derivatives of cellulose, other polysaccharides, polysaccharide gums and proteins.

Examples of starches and starch derivatives include, but are not limited to, modified starches, cationic and anionic starches, and starch esters such as starch acetate, starch hydroxyethyl ether, alkyl starches, dextrins, amine starches, phosphates starches, and dialdehyde starches.

Examples of derivatives of cellulose include, but are not limited to, cellulosic esters (e.g., cellulose formate, cellulose acetate, cellulose diacetate, cellulose propionate, cellulose butyrate, cellulose valerate, mixed esters, and mixtures thereof) and cellulosic ethers (e.g., methylhydroxyethylcellulose, hydroxymethylethylcellulose, carboxymethylcellulose, methylcellulose, ethylcellulose, hydroxyethylcellulose, hydroxyethylpropylcellulose, and mixtures thereof).

Other polysaccharide-based polymers that can be incorporated into the polymer blends of the invention include alginic acid, alginates, phycocolloids, agar, gum arabic, guar gum, acacia gum, carrageenan gum, furcellaran gum, ghatti gum, psyllium gum, quince gum, tamarind gum, locust bean gum, gum karaya, xanthan gum, and gum tragacanth, and mixtures or derivatives thereof.

Suitable protein-based polymers include, for example, Zein® (a prolamine derived from corn), collagen (extracted from animal connective tissue and bones) and derivatives thereof such as gelatin and glue, casein (the principle protein in cow milk), sunflower protein, egg protein, soybean protein, vegetable gelatins, gluten and mixtures or derivatives thereof.

4. Non Biodegradable Polymers.

Although polymer blends preferably include biodegradable polymers, it is certainly within the scope of the invention to include one or more polymers which are not biodegradable. If the nonbiodegradable polymer generally comprises a disperse phase rather than the dominant continuous phase, polymer blends that include a nonbiodegradable polymer will nevertheless be biodegradable, at least in part. When degraded, the polymer blend may leave behind a nonbiodegradable residue that nevertheless is superior to the waste left behind by sheets and films that are entirely made of nonbiodegradable polymers.

Examples of common nonbiodegradable polymers suitable for forming sheets and films include, but are not limited to, polyethylene, polypropylene, polybutylene, PET, PETG, PETE, polyvinyl chloride, PVDC, polystyrene, polyamides, nylon, polycarbonates, polysulfides, polysulfones, copolymers including one or more of the foregoing, and the like.

D. Polymer Blends.

1. Concentration Ranges of Biodegradable Polymers.

The concentrations of the various components within the polymer blends used to treat fibrous sheets will depend on a number of factors, including the desired physical and mechanical properties of the treated sheet, the performance criteria of articles to be manufactured from a treated sheet, the processing equipment used to manufacture and convert the blends and treated sheets into the desired article of manufacture, and the particular components within the blends. One of ordinary skill in the art will be able, in light of the specific examples and other teachings disclosed herein, to select and optimize the concentrations of the various components through routine testing.

In view of the wide variety of polymer blends within the scope of the invention, as well as the wide variety of different properties that may be engineered within the blends, the hard and soft polymers may be included within widely varying concentration ranges. In those cases where the polymer blend or composition includes a blend of stiff and soft biodegradable polymers, the one or more stiff biodegradable polymers within the inventive blends may have a concentration in a range from about 20% to about 99% by weight of the biodegradable polymers exclusive of the fibrous sheet and any fillers, preferably a concentration of at least about 30% by weight of the polymer blend, more preferably at least about 40% by weight of the polymer blend, more especially preferably greater than, but not including, 50% by weight of the polymer blend, and most preferably at least about 55% by weight of the polymer blend.

Similarly, when a blend of stiff and soft polymers is employed, the soft polymers may have a concentration in a range from about 1% to about 80% by weight of the biodegradable polymers exclusive of the fibrous sheet and any fillers, preferably a concentration up to about 70% by weight of the polymer blend, more preferably up to about 60% by weight of the polymer blend, more especially preferably less than, but not including, 50% by weight of the polymer blend, and most preferably up to about 45% by weight of the polymer blend.

The foregoing concentrations are measured in terms of the blend of hard and soft polymers exclusive of any optional components that may be added, as described and identified above.

2. Properties of Polymer Blends and Treated Sheets.

The polymer blends may be engineered to have a variety of desired properties as described herein. The properties of the final treated fibrous sheet will depend on a number of factors, including mix design of the polymer blend, processing conditions, post-formation processing, product size, particularly thickness, and the like. In the case of treated sheets intended to be used as "wraps", such as wraps used to enclose meats, other perishable food items, and especially fast food items (e.g., sandwiches, burgers and dessert items), it will generally be desirable to provide treated sheets having good "dead-fold" properties so that once folded, wrapped or otherwise manipulated into a desired orientation, such wraps will tend to maintain their orientation so as to not spontaneously unfold or unwrap, as which occurs with a large number of plastic sheets and films (e.g., polyethylene).

In order to improve the dead-fold properties of treated sheets biodegradable polymers may be selected which yield blends having a relatively high Young's modulus, preferably at least about 100 MPa, more preferably at least about 150 MPa, and most preferably at least about 200 MPa. In general, increasing the concentration of the stiff biodegradable polymer will tend to increase the Young's modulus. The Young's modulus may also be increased by loading the polymer blends with one or more fillers, such as particulate or fibrous fillers, as described above.

In addition to, or instead of, increasing the Young's modulus to improve dead-fold, the treated sheets may be optionally processed to increase the "bulk hand feel" of a sheet, which is done by disrupting the generally planar nature of the sheet. This can be done, for example, by embossing, crimping, quilting or otherwise texturing the sheet so as to have regularly spaced-apart or random hills and valleys rather than simply a smooth, planar sheet. This may be done, for example, by passing the sheet through a pair of knurled or other embossing-type rollers. Such texturing increases the ability of a sheet to take and maintain a fold, crinkle, creases or other bend, thus improving the dead-fold properties of the sheet.

Another way to increase the surface area of the treated sheets according to the invention so as to increase their bulk hand feel and/or dead-fold is to include particulate fillers in which at least a portion of the particles have a particle size diameter that equals or exceeds the thickness of the polymer coating. In this way, treated sheets can be manufactured that have dead-fold approaching or equaling 100%, which exceeds the dead-fold properties of virtually all conventional paper or plastic wraps and sheets currently on the market. An example of a conventional sheet or wrap having 100% dead-fold is aluminum or other metal foils.

Other properties that may be desirable when manufacturing food wraps are heat resistance, microwaveability, and insulation ability. Increasing the amount of inorganic filler within the polymer blend or composition used to coat or impregnate a fibrous sheet tends to increase the heat resistance, microwaveability, and insulation ability of the treated fibrous sheets. It has been found, for example, that a soft biodegradable polymer can be blended with an inorganic filler, such as ground or precipitated silica, to yield a biodegradable polymer composition that includes at least about 30% by weight of the inorganic filler. Adding at least about 30% by weight inorganic filler to a soft biodegradable polymer yields a treated fibrous sheet that does not break down when placed in a microwave oven.

The use of fillers, coupled with specific processing techniques, can also be used to create "cavitation". Cavitation occurs as the thermoplastic polymer fraction is pulled in either a monoaxial or biaxial direction and the filler particles create a discontinuity in the film or sheet that increases in size during stretching. During stretching, a portion of the stretched polymer pulls away from the filler particles, resulting in tiny cavities in the vicinity of the filler particles. This, in turn, results in greatly increased breathability and vapor transmission of the sheets and films. It also results in films or sheets having a touch and feel that much more closely resembles the touch and feel of paper, as contrasted with conventional plastic sheets and films. The result is a sheet, film or wrap that can be used for applications that are presently performed or satisfied using paper products (i.e., wraps, tissues, printed materials, etc.)

Treated sheets according to the invention can have any desired thickness. Treated sheets suitable for wrapping, enclosing or otherwise covering food items or other solid substrates will typically have a measured thickness between about 0.0003" and about 0.01" (about 7.5–250 microns), and a calculated thickness between about 0.00015" and about 0.005" (about 4–125 microns).

The measured thickness will typically be between 10–100% larger than the calculated thickness when the sheets and films are made from compositions that have a relatively high concentration of particulate filler particles, which can protrude from the surface of the treated sheet. This phenomenon is especially pronounced when significant quantities of filler particles having a particle size diameter that is larger than the thickness of the polymer matrix are used.

Treated sheets suitable for use as wraps will preferably have a measured thickness in a range from about 0.0004" to about 0.005" (about 10 to about 125 microns), more preferably in a range from about 0.0005" to about 0.003" (about 12 to about 75 microns), and most preferably in a range from about 0.001" to about 0.002" (about 25 to about 50 microns). On the other hand, treated sheets suitable for use as wraps will preferably have a calculated thickness in a range from about 0.0002" to about 0.003" (about 5 to about 75 microns), more preferably in a range from about 0.0003" to about 0.002" (about 7.5 to about 50 microns), and most preferably in a range from about 0.0005" to about 0.0015" (about 12 to about 40 microns).

The difference between the calculated and measured thickness tends to increase with increasing filler content and also with increasing particle size. Conversely, the difference between the calculated and measured thickness tends to decrease with decreasing filler content and also with decreasing particle size. Treated sheets that include no fillers, or lower quantities of fillers having a particle size diameter that is substantially lower than the thickness of the polymer matrix, will have a measured thickness that is similar or equal to the calculated thickness.

Another important property of the biodegradable blends is that when such blends are used to coat or impregnate fibrous sheets, the treated sheets are readily printable without further processing. Thus, another advantage of utilizing the inventive polymer blends in the manufacture of wraps is that such blends are generally able to accept and retain print much more easily than conventional plastics or waxed papers. Many plastics and waxes are highly hydrophobic and must be surface oxidized in order to provide a chemically receptive surface to which ink can adhere. Biodegradable polymers, on the other hand, typically include oxygen-containing moieties, such as ester or amide groups, to which inks can readily adhere.

3. Measuring Dead-Fold

The term "dead-fold" refers to the tendency of a sheet to maintain a crease, crinkle, fold or other bend. The dead-fold properties of a sheet can be accurately measured using a standard test known in the art. This test provides the ability to compare and contrast the dead-fold properties of various sheets. The following equipment is useful in performing the standard dead-fold test: (1) a semicircular protractor, divided along a 1" diameter semicircle; (2) a weight consisting of a smooth-faced metal block that is 0.75"∓0.05" by 1.25"±0.05" and of such a thickness so as to weigh 50 g±0.05 g; (3) a 1"×4" template for cutting test specimens; (4) a timer or stopwatch capable of timing to 1 second; (5) a utility knife or other cutting tool; and (6) a humidity chamber.

The first step is preparation of an appropriately sized sample. In the case where a sheet has different properties in the machine direction compared to the cross-machine direction it may be useful to measure and average the dead-fold properties in both directions. The standard sample specimen is a 1"×4" strip of the sheet to be tested.

The second step is a conditioning step in order to ensure uniformity of test conditions. The specimens are conditioned by placing them in a humidity chamber at 23 C and 50% relative humidity for a minimum of 24 hours.

The third step is the actual dead-fold test of each conditioned test strip. The specimen is removed from the humidity chamber and its weight recorded. A light mark is made 1" from one end of the test strip. The test strip is then placed on a flat surface and bent over at the mark but without creasing the strip. Next, the weight is placed squarely and gently over the bend with two thirds (or 0.5") of the weight overlapping the specimen so that a crease is formed, and with one third or (0.25") of the weight overhanging the crease. The edges of the weight parallel to the strip should project evenly (about 0.125") beyond each side of the strip. The weight is allowed to rest on the specimen for 10 seconds. Then it is removed. After exactly 30 seconds, the angle formed by the crease is measured.

The foregoing process is repeated using the other side of the strip and using as many additional strips as will give a statistically accurate measure of the dead-fold properties of a given sheet or film. The average angle A is then input into the following formula to determine the percentage dead-fold C for a given sample:

$$C=100*(180-A)/180$$

If the angle A is 0° (i.e., where the crease is maintained so that no spring back is observed), the sample has 100% dead-fold ($C=100*(180-0)/180=100\%$). At the other extreme, if the angle A is 180° (i.e., where the sample springs all the way back so that the sample is essentially flat, the sample has 0% dead-fold ($C=100*(180-180)/180=0\%$). In the middle, a sample that springs back half way so as to form a right angle has 50% dead-fold ($C=100*(180-90)/180=50\%$).

When used to wrap foods, or whenever good dead-fold properties are desired, treated sheets according to the invention can be manufactured so as to have a dead-fold of at least about 50%. Preferably, treated sheets will have a dead-fold of at least about 60%, more preferably at least about 70%, more especially preferably at least about 80%, and most preferably at least about 90%. Treated sheets according to the invention have been developed that have a dead-fold approaching or equal to 100%. By way of comparison, sheets and films made from polyethylene (e.g., for use in making sandwich or garbage bags) typically have a dead-fold of 0%. Standard paper wraps commonly used in the fast food industry typically have a dead-fold between about 40–80%. Thus, treated sheets according to the invention can be manufactured so as to have dead-fold properties that meet or exceed those of standard paper wraps, and which are many times greater than conventional plastic films and sheets, often orders of magnitude greater.

III. Methods of Manufacturing Polymer Blends and Fibrous Sheets

It is within the scope of the invention to employ any manufacturing apparatus known in the art of manufacturing thermoplastic compositions to form the polymer and any coating apparatus to coat or impregnate fibrous sheets with the polymer blends. Examples of suitable mixing apparatus that can be used to form polymer blends according include a twin-shafted kneader with meshing screws having kneading blocks sold by the Buss Company, a BRABENDER mixer, a THEYSOHN TSK 045 compounder, which is a twin-shaft extruder with shafts rotating in the same direction and which has multiple heating and processing zones, a BUSS KO Kneader having a heatable auger screw, a BAKER-PERKINS MPC/V-30 double and single auger extruder, single or twin auger OMC extruders, a Model EPV 60/36D extruder, a BATTAGGION ME100 direct-current slow mixer, a HAAKE Reomex extruder, a COLLIN Blown Film Extruder, a BATTENFELD-GLOUCESTER Blown Film Extruder, and a BLACK-CLAWSON Cast Film Extruder.

Many of the foregoing mixers are also extruders, which makes them suitable for extruding films or sheets from the polymer blends, which can then be laminated together with a fibrous sheet. Alternatively, polymer blends can be made using transfer-line-injection technology where resin manufacturers can inject the various minor components of these blends into the main poly components during manufacture. One of ordinary skill in the art will be able to select and optimize an appropriate manufacturing apparatus according to the desired article to be manufactured. Once a thermoplastic melt has been formed using any of the above-mentioned mixers, or any other appropriate mixing and melting apparatus known in the thermoplastic art, virtually any molding, extrusion, shaping or coating apparatus known in the thermoplastic molding or processing art can be used to produce finished articles of manufacture comprising fibrous sheets that have been coated or impregnated with a polymer blend to render the sheets more resistant to penetration by liquids.

In a preferred embodiment for manufacturing sheets and films from the polymer blends, which can then be laminated together with fibrous sheets, the sheets and films can be manufactured using a compounding twin screw extruder to prepare the blends, and a blown film or cast film line to make the films and sheets. Blown films and sheets tend to have similar, if not identical, strength and other performance properties in the biaxial direction due to how they are processed (i.e., they are extruded as a tube and then expanded in all directions by blowing air within the confines of the tube, causing it to expand like a balloon). Cast films or sheets, on the other hand, unless subjected to biaxial stretching, will be substantially stronger (e.g. will have substantially greater tensile strength) in the machine direction and will be substantially more tear resistant in the cross-machine direction. When extruding a thermoplastic material, the polymer molecules tend to be oriented in the machine direction. Machine direction orientation is further increased if the extruded sheet or film is passed through a nip to decrease the sheet or film thickness in the machine direction.

The treated sheets according to the invention may be coated or impregnated on one or both sides as desired. They may be formed by laminating a fibrous sheet with one or more sheets or films, co-extruding a sheet or film of a polymer blend with a fibrous sheet, dipping, spreading (e.g., using a doctor blade), spraying, and the like. Because a portion of the treated sheets are thermoplastic, the sheets can be post-treated by heat sealing to join two ends together to form sacks, pockets, pouches, and the like. They can be laminated onto existing sheets or substrates.

Monoaxial or biaxial stretching of sheets and films used to coat a surface of a fibrous sheet can be used to create cavitation. To create cavitation, a particulate filler is included that yields discontinuities as the sheet or film is stretched while still in a thermoplastic condition. Cavitation increases the breathability and vapor transmission of the sheets and films. It also results in films or sheets having a touch and feel that much more closely resembles the touch and feel of paper compared to conventional thermoplastic sheets and films.

When employing certain coating or impregnating techniques, such as spreading or spraying a biodegradable polymer composition onto a fibrous sheet, it may be advantageous to increase the MFI of the molten polymer composition. This allows the molten polymer composition to flow more readily so as to coat or impregnate the fibrous sheet. Preferably, the molten polymer composition has an MFI of at least about 40 g/10 min., more preferably at least about 70 g/10 min., and most preferably at least about 100 g/10 min.

As discussed above, the MFI can, depending on the biodegradable polymer or polymer blend, be increased to a desired level by heating it to a higher temperature. In some cases, however, heating a polymer to temperature that might theoretically decrease the MFI to an acceptable level might, instead, scorch, burn or otherwise damage the polymer composition. In such cases it may be desirable to add a plasticizer to the polymer composition. The plasticizer might be a volatile or non-volatile plasticizer, as discussed above.

According to one embodiment, water is added to increase the MFI of the molten polymer composition. Adding 200 ppm water to a polymer composition has been found to increase the MFI from 4 g/10 min. to 40 g/10 min. Based on this, one of ordinary skill can adjust the water concentration as desired to raise or lower the MFI to a predetermined level.

In the case of a spray coating method, one or more volatile solvents, such as alcohols, ketones, or chlorinated hydrocarbons, can be used to raise the MFI of the molten polymer composition. During or after the coating process, as the volatile solvent is driven off by evaporation, the solvent is advantageously recovered and reused for both economic and environmental reasons.

IV. EXAMPLES

The following examples are presented in order to more specifically teach compositions and process conditions for forming biodegradable polymer blends, as well as treated fibrous sheets therefrom. The examples include various mix designs of the inventive biodegradable polymer blends as well various processes for manufacturing the blends and then forming polymeric sheets and films therefrom.

Examples 1–3

Biodegradable polymer films were manufactured from biodegradable polymer blends having the following mix designs, with the concentrations being expressed in terms of weight percent of the entire polymer blend:

| Example | Biomax 6926 | Ecoflex-F | $SiO_2$ |
|---------|-------------|-----------|---------|
| 1 | 94.84% | 5% | 0.16% |
| 2 | 89.84% | 10% | 0.16% |
| 3 | 79.84% | 20% | 0.16% |

The foregoing polymer blends were blended and blown into films at Gemini Plastics, located in Maywood, Calif., using DuPont supplied BIOMAX 6926 (both new and old lots), a silica master batch in BIOMAX 6926 base resin supplied by DuPont, and ECOFLEX-F resin obtained from BASF. The films were blown using a Gemini film blowing extruder (L/D 24/1) equipped with a 2 inch barrier mixing screw containing a Maddock shear mixing tip, and a 4 inch diameter annular die with a die gap of 0.032–0.035".

Even though a typical quantity of silica antiblock was used (i.e., 0.16%), significant blocking of the film was observed for the film made using the mix design of Example 3 (i.e. 20% ECOFLEX); however, there was no observed blocking of the 5 and 10% ECOFLEX blends of Examples 1 and 2. For purposes of comparison, films of neat ECOFLEX and BIOMAX were manufactured. The neat ECOFLEX films were manufactured using BASF ECOFLEX-F resin and a 30% talc master batch in the same resin. The neat BIOMAX films (new and old) included 0.16% $SiO_2$, while the neat ECOFLEX films included 4.5% talc. The mechanical properties of the BIOMAX/ECOFLEX blend films and the control BIOMAX and neat ECOFLEX-F films were measured under ambient conditions. The data generated is show graphically in Charts 1–8 depicted in FIGS. 1–8, respectively.

Chart 1, depicted in FIG. 1, is a plot of the strain rate versus percent elongation at break for the various films tested. At 500 mm/min. strain rate, both new and old BIOMAX films displayed poor elongation. The neat ECOFLEX films and all of the films made from the BIOMAX-ECOFLEX blends had significantly better elongations than the neat BIOMAX films at all of the strain rates studied. On the other hand, the 20% ECOFLEX blend of Example 3 exhibited equal or better elongation compared to the neat ECOFLEX films at lower strain rates, even though these films included nearly 80% BIOMAX, which was shown to have very poor elongation.

Figure 2:
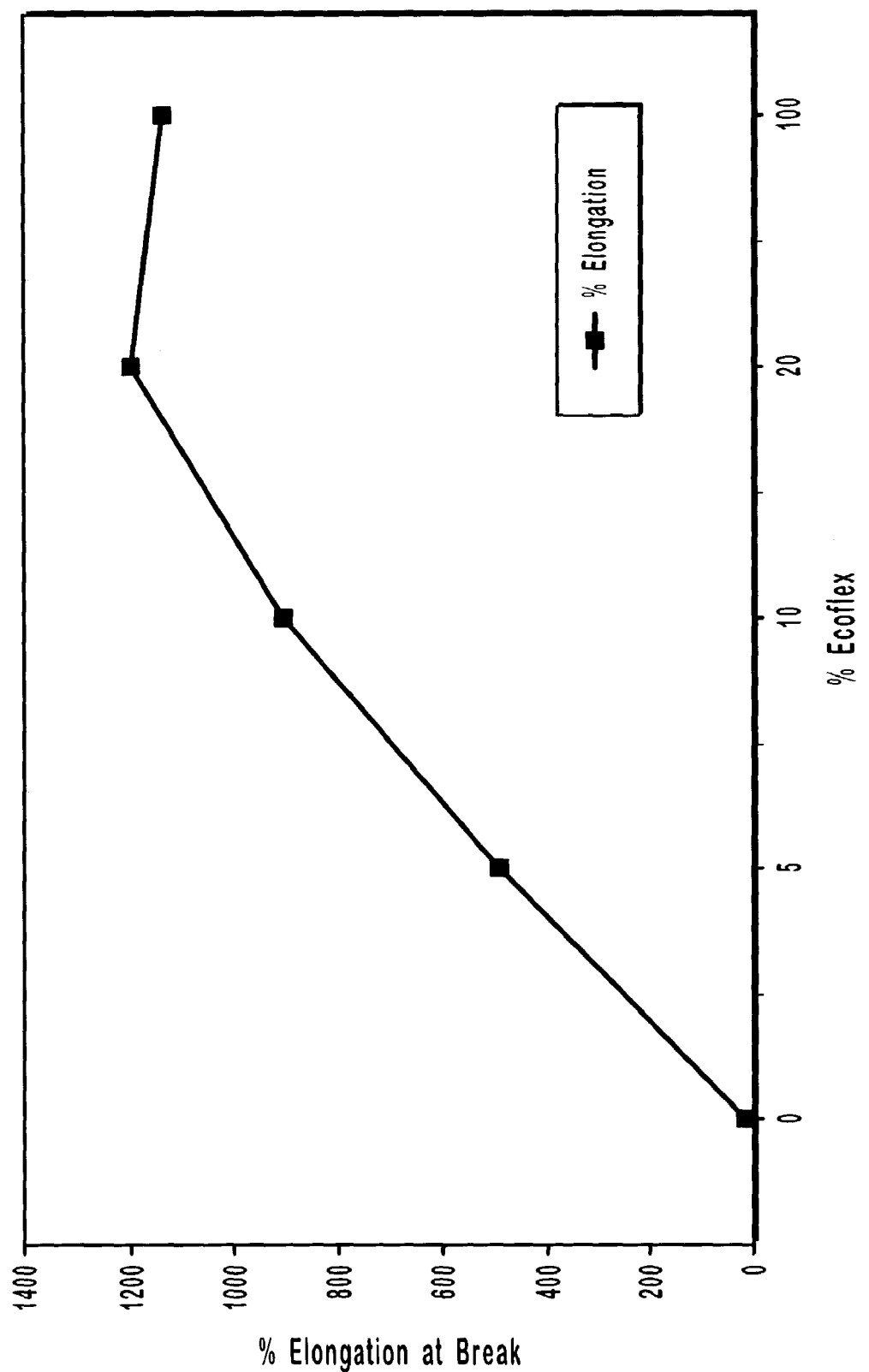
FIG. 2 is a plot of the percent elongation of various neat polymer and blended polymer films versus the concentration of ECOFLEX within the films at a fixed strain rate of 500 mm/min.

Chart 2, depicted in FIG. 2, is a plot of percent elongation versus percentage of ECOFLEX in the BIOMAX/ECOFLEX blends measured at a fixed strain rate of 500 mm/min. As represented by Chart 2, there was a nearly linear improvement in the percent elongation as the concentration of ECOFLEX was increased. Moreover, the 20% ECOFLEX blend of Example 3 had an elongation as good as the neat ECOFLEX films.

Figure 3:
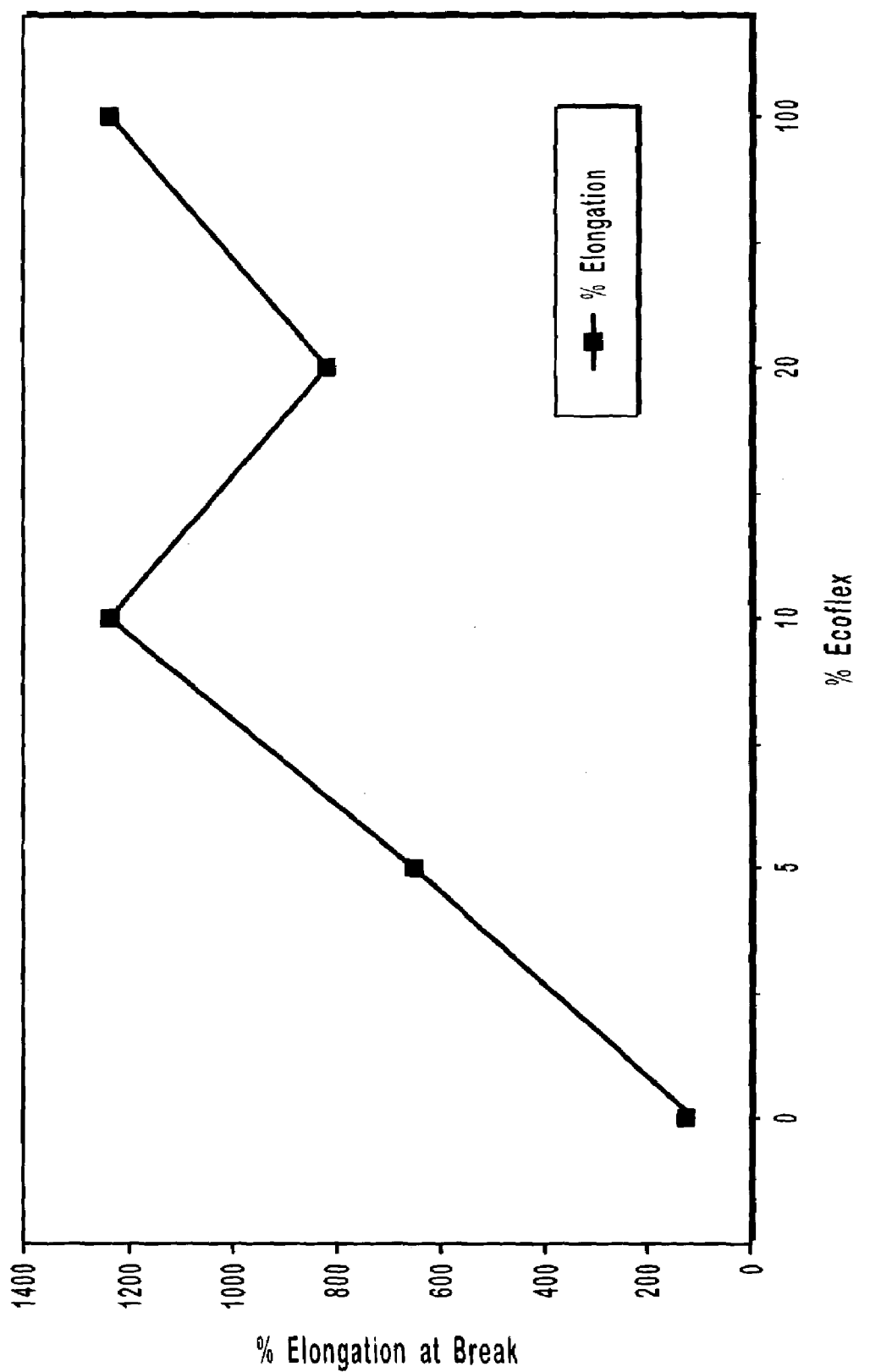
FIG. 3 is a plot of the percent elongation of various neat polymer and blended polymer films versus the concentration of ECOFLEX within the films at a fixed strain rate of 1000 mm/min.

Chart 3, depicted in FIG. 3, similarly plots the percent elongation versus the percentage of ECOFLEX in the BIOMAX/ECOFLEX blends measured at a fixed strain rate of 1000 mm/min. Again, a dramatic improvement in the elongation of the BIOMAX/ECOFLEX blend was seen as the concentration of ECOFLEX reached 10 and 20%, respectively, although the trend was not as clear as the data in Chart 2, measured at a fixed strain rate of 500 mm/min.

Figure 4:
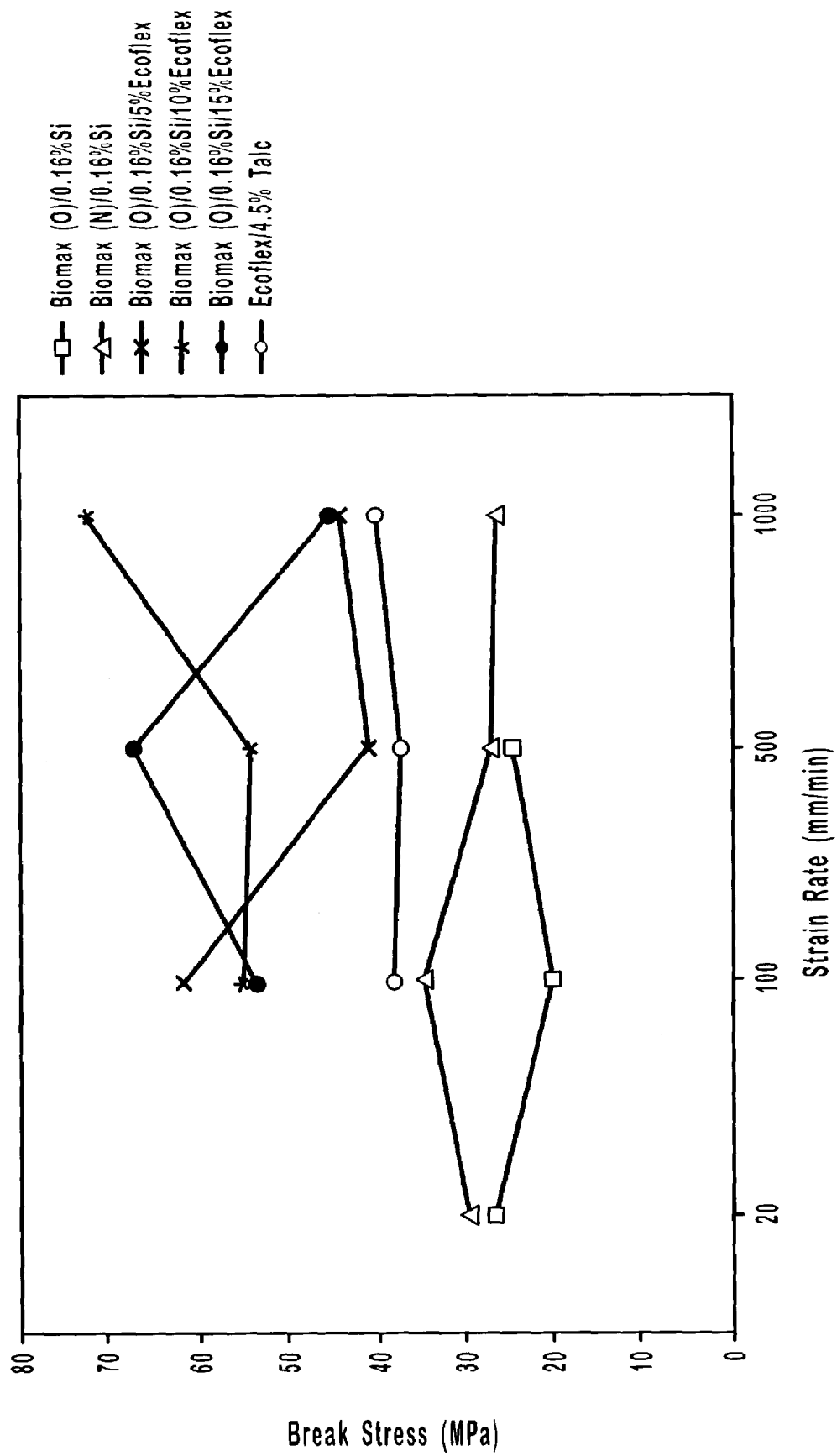
FIG. 4 is a plot of the break stress versus the applied strain rate for various neat and blended polymer films.

Chart 4, depicted in FIG. 4, is a plot of the strain rate versus break stress of the various films. Again, neat ECOFLEX and all of the BIOMAX/ECOFLEX blends had significantly better break stress than the neat BIOMAX films at all of the strain rates studied. Moreover, the BIOMAX/ECOFLEX blends had significantly better break stress than the neat ECOFLEX films at all strain rates, thus showing that the BIOMAX/ECOFLEX blends are all stronger in tensile strength than either of neat BIOMAX or ECOFLEX.

Figure 5:
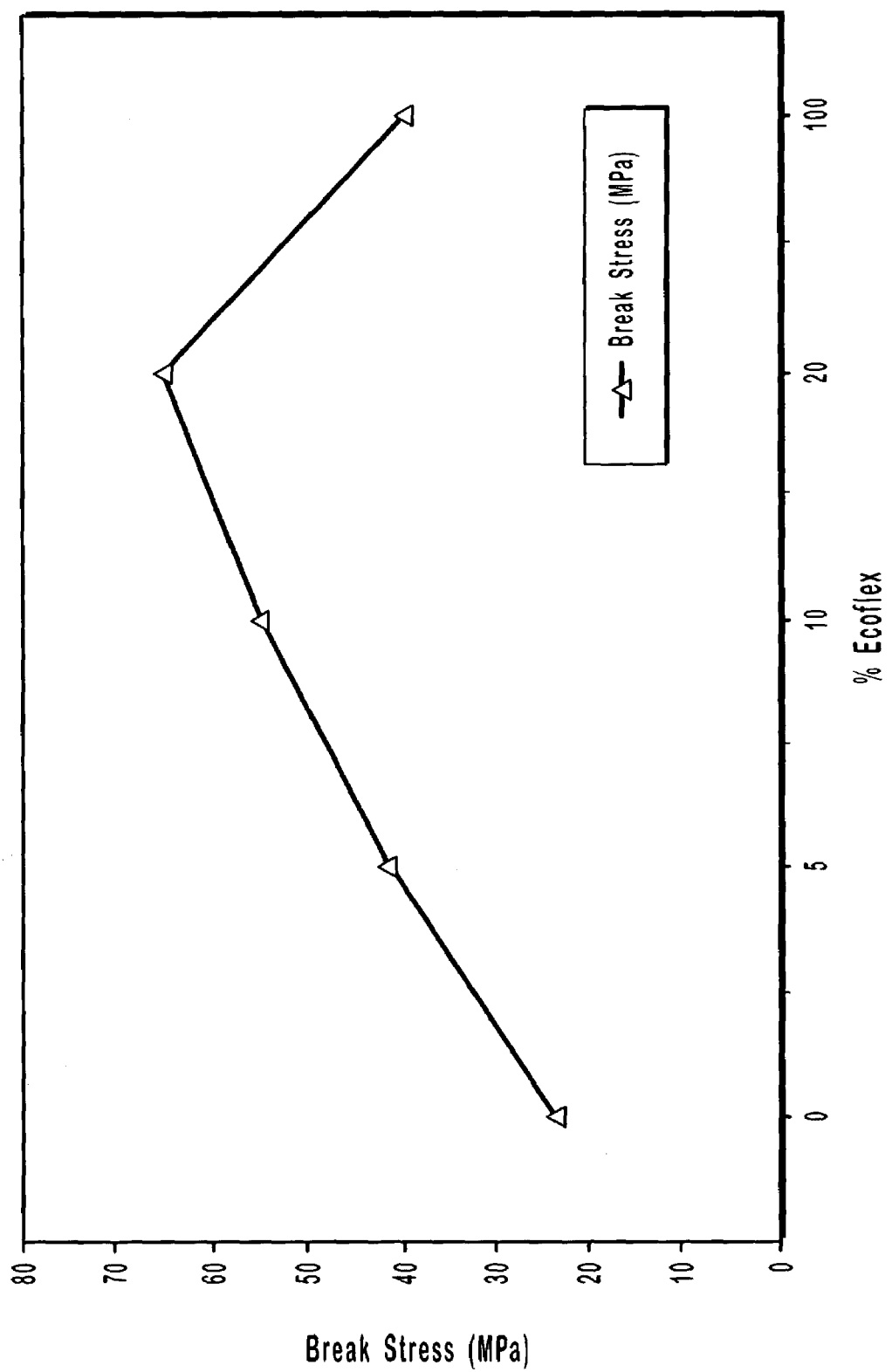
FIG. 5 is a plot of the break stress of various neat polymer and blended polymer films versus the concentration of ECOFLEX within the films at a fixed strain rate of 500 mm/min.

Chart 5, depicted in FIG. 5, is a plot of the break stress versus percent ECOFLEX in the BIOMAX/ECOFLEX blends of Examples 1–3 measured at a fixed strain rate of 500 mm/min. Once again, a nearly linear increase in break stress was observed as the concentration of ECOFLEX was increased. Moreover, the 20% blend of Example 3 exhibited the surprising and unexpected result of having nearly twice the break stress as the neat ECOFLEX film, and nearly three times the break stress as the neat BIOMAX film.

Figure 6:
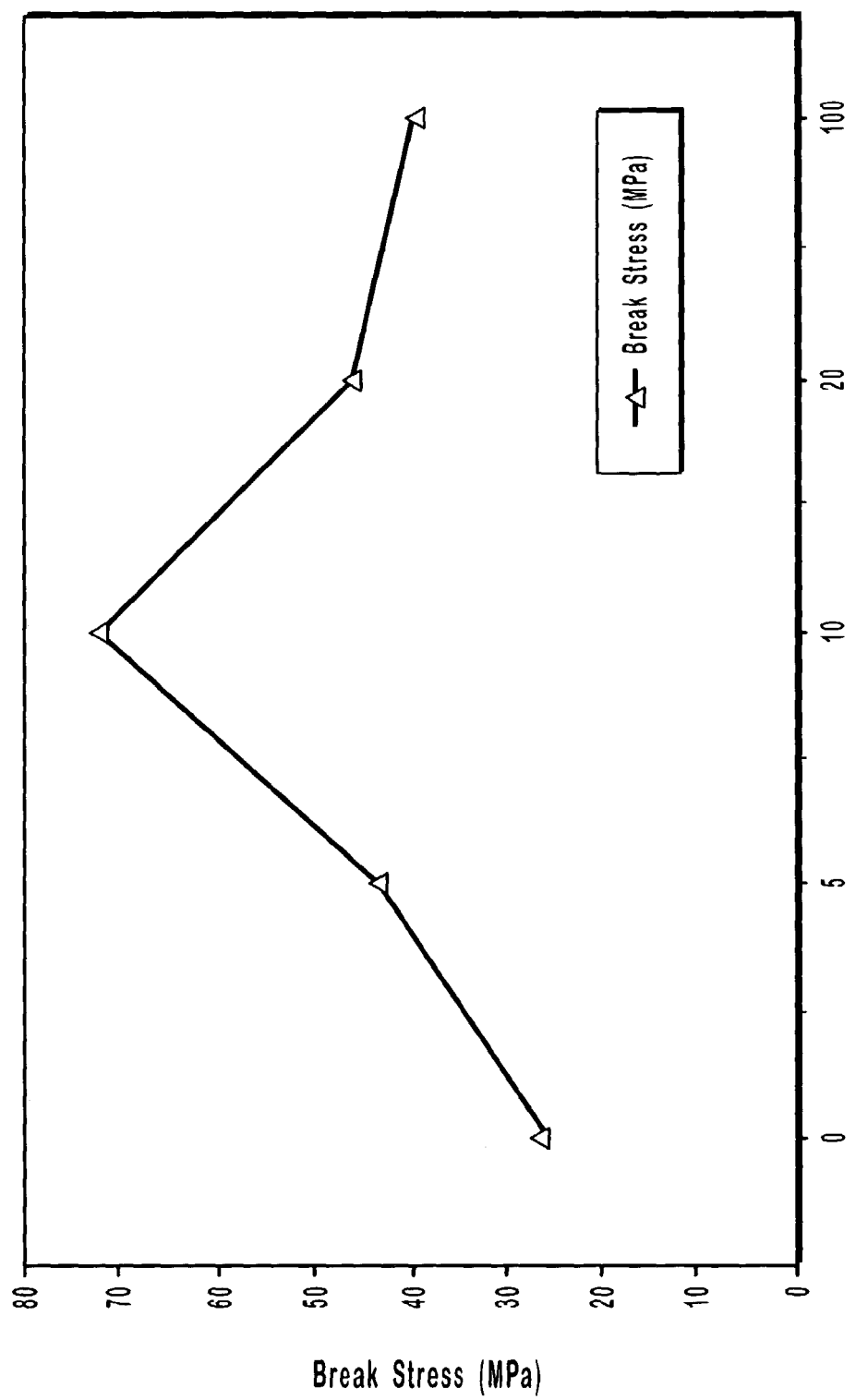
FIG. 6 is a plot of the break stress of various neat polymer and blended polymer films versus the concentration of ECOFLEX within the films at a fixed strain rate of 1000 mm/min.

Chart 6, depicted in FIG. 6, is a plot of the break stress versus percent ECOFLEX in the BIOMAX/ECOFLEX blends of Examples 1–3 measured at a fixed strain rate of 1000 mm/min. At this strain rate, the 10% ECOFLEX blend of Example 2 had the highest break stress, with a maximum peak stress of 72 MPa.

Figure 7:
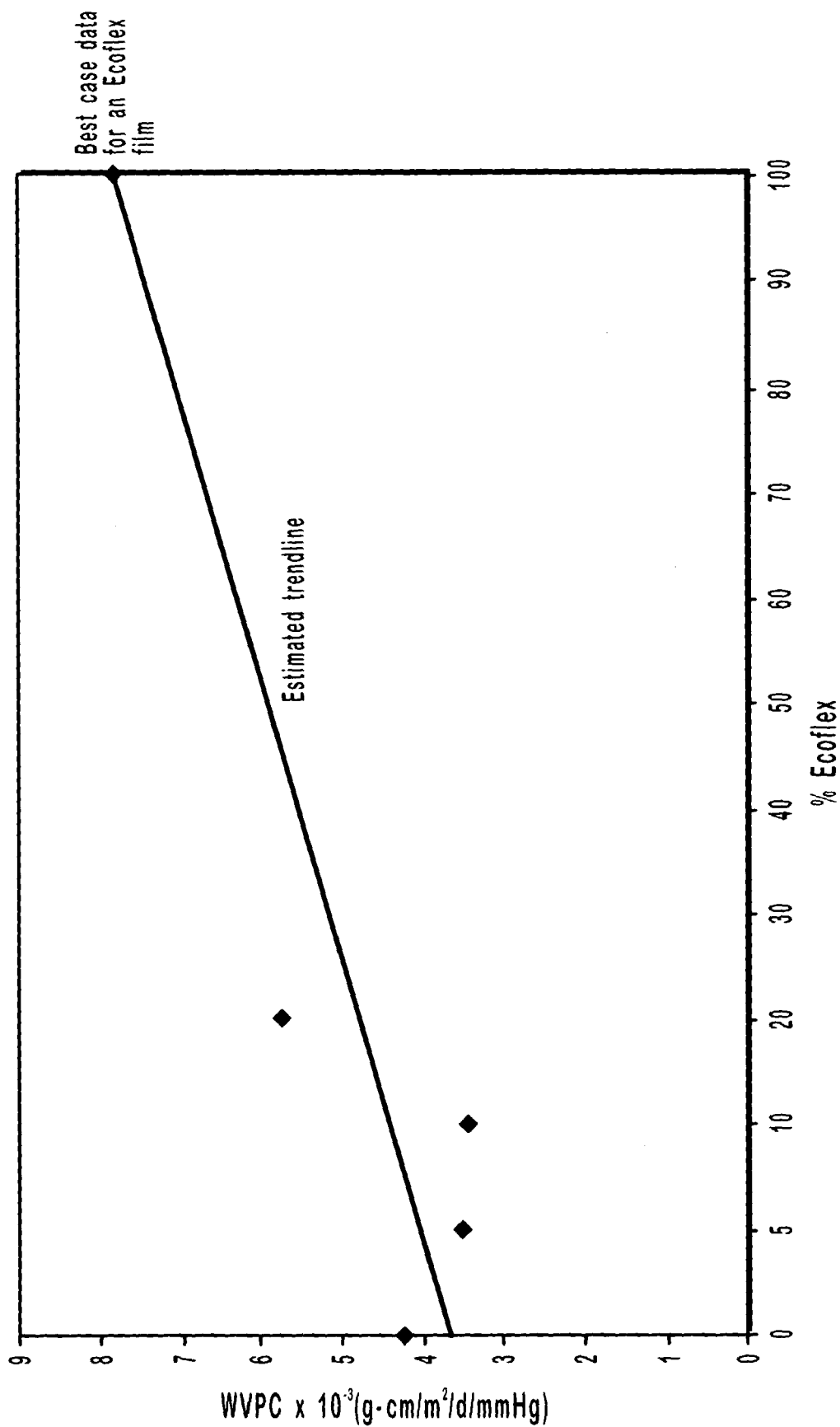
FIG. 7 is a plot of the Water Vapor Permeability Coefficients (WVPC) of various neat polymer and blended polymer films as a function of the concentration of ECOFLEX within the films, and an estimated trend line based on the lowest measured WVPC for a neat ECOFLEX film of $7.79 \times 10^{-3}$ g cm/m$^2$/d/mm Hg.
Figure 8:
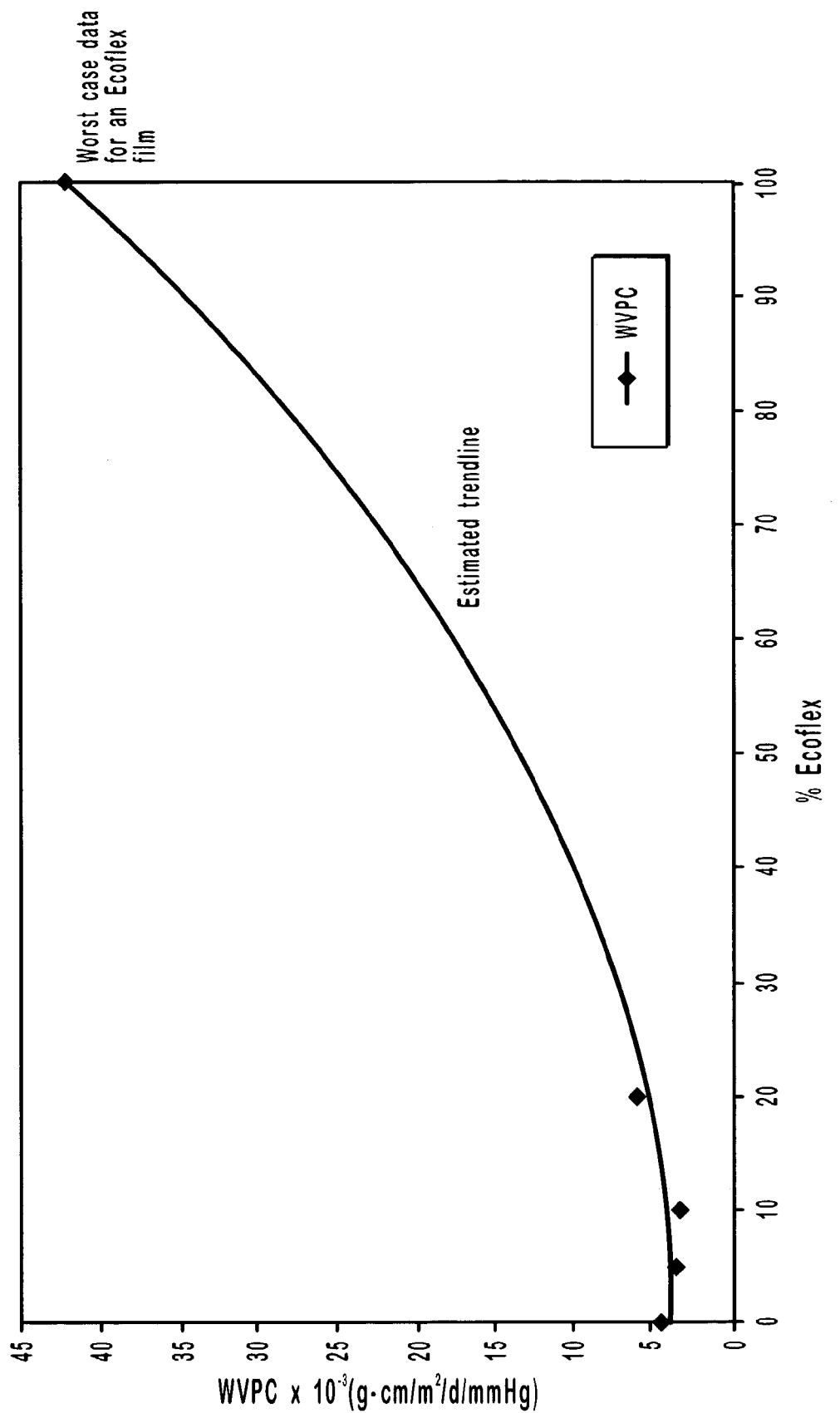
FIG. 8 is a plot of the Water Vapor Permeability Coefficients (WVPC) of various neat polymer and blended polymer films as a function of the concentration of ECOFLEX within the films, and an estimated trend line based on the highest measured WVPC for a neat ECOFLEX film of $42 \times 10^{-3}$ g cm/m$^2$/d/mm Hg.

Charts 7 and 8, depicted in FIGS. 7 and 8, respectively, plot the water vapor permeability coefficient (WVPC) of the various films as a function of the concentration of ECOFLEX within the films. In Chart 7, the estimated trend line is based on a WVPC of $7.79 \times 10^{-3}$ g cm/m$^2$/d/mm Hg, which is the lowest measured WVPC for a neat ECOFLEX film. In Chart 8, the estimated trend line is alternatively based on a WVPC of $42 \times 10^{-3}$ g cm/m$^2$/d/mm Hg, which is the highest measured WVPC for a neat ECOFLEX film. The data in Charts 7 and 8 indicate that the water vapor barrier properties of the 5 and 10% ECOFLEX blends of Examples 1 and 2 were essentially the same as that of the neat BIOMAX film. The WVPC data for all samples were measured by the standard procedures described in the Test Method ASTM F 1249-90.

Figure 9:
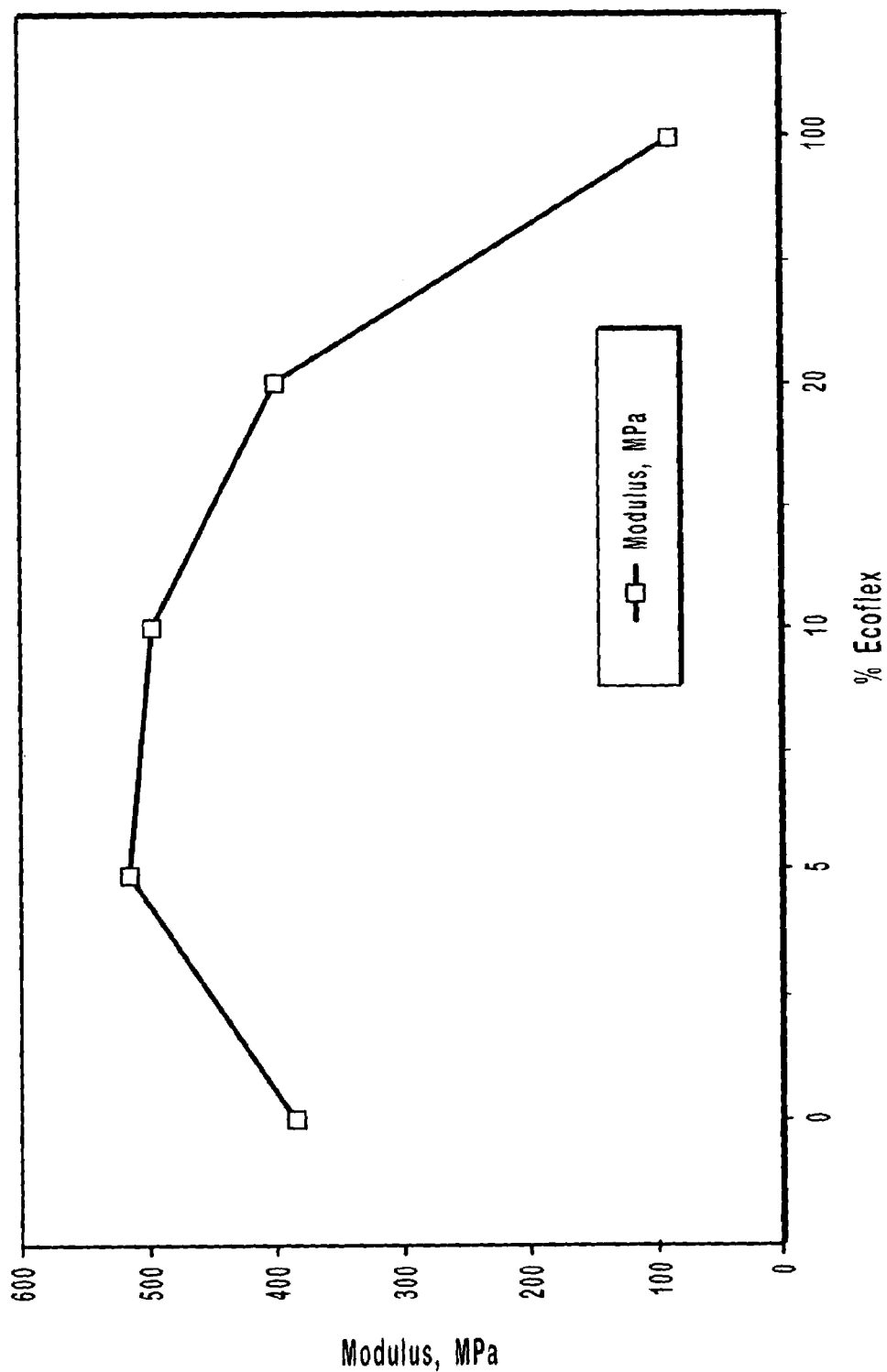
FIG. 9 is a plot of the modulus of various neat polymer and blended polymer films versus the concentration of ECOFLEX within the films.

Chart 9, depicted in FIG. 9, is a plot of the modulus of various films as a function of the concentration of ECOFLEX within the films. Surprisingly, the modulus of blends containing BIOMAX and ECOFLEX are significantly higher than of neat BIOMAX and ECOFLEX. Because one of the uses of the films manufactured according to the present invention is as a wrap having good dead-fold properties, and because the degree of dead-fold is believed to be related to the modulus of a film, blends of BIOMAX and ECOFLEX appear to have superior dead-fold properties over each of the neat BIOMAX and ECOFLEX films, with the 5% and 10% blends exhibiting the highest modulus.

The foregoing films are used to laminate at least one side of a fibrous sheet, such as a tissue paper, more particularly a 12–15 lb/3000 ft tissue paper, to yield a treated sheet. The treated sheet can be used as a food packaging wrap that resists penetration by water and oils found in food.

Examples 4–5

Films were manufactured from biodegradable polymer blends having the following mix designs, with the concentrations being expressed in terms of weight percent of the entire polymer blends:

| Example | Biomax 6926 | Ecoflex-F | Talc |
|---------|-------------|-----------|------|
| 4 | 79.7% | 16.7% | 3.6% |
| 5 | 76.7% | 16.7% | 6.6% |

The films were blown using a Gemini film blowing extruder (L/D 24/1) equipped with a 2 inch barrier mixing screw containing a Maddock shear mixing tip, and a 4 inch diameter annular die with a die gap of 0.032–0.035". The film of Example 5 had better dead-fold properties than the film of Example 4, which might be attributable to the higher concentration of talc within the blend used in Example 5.

The foregoing films are used to laminate at least one side of a fibrous sheet, such as a tissue paper, more particularly a 12–15 lb/3000 ft$^2$ tissue paper, to yield a treated sheet. The treated sheet can be used as a food packaging wrap that resist penetration by water and oils found in food.

Example 6

A film was manufactured from a biodegradable polymer blend having the following mix design, with the concentration being expressed in terms of weight percent of the entire polymer blend:

| | |
|---|---|
| ECOFLEX-F | 20% |
| Thermoplastic Starch | 50% |
| Polylactic Acid | 15% |
| Inorganic Filler | 15% |

The Thermoplastic Starch was obtained from Biotec Biologische Natuverpackungen GmbH & Co., KG ("Biotec"), located in Emmerich, Germany. The polylactic acid was obtained from Cargill-Dow Polymers, LLC, located in Midland, Mich., USA. The inorganic filler was calcium carbonate obtained from OMYA, division Pluess-Staufer AG, located in Oftringen, Switzerland.

The foregoing blend was manufactured and blown into films using a proprietary extrusion line thermoplastic starch extrusion/film blowing apparatus manufactured and assembled specifically for Biotec. In particular, the extrusion/film blowing apparatus was manufactured by Dr. Collin GmbH, located in Ebersberg, Germany. A detailed description of an extrusion/film blowing apparatus similar to the one used by Biotec is set forth in U.S. Pat. No. 5,525,281 to Lörcks et al. U.S. Pat. No. 6,136,097 to Lörcks et al. discloses processes for manufacturing intermediate thermoplastic starch-containing granulates that can be further processed to make films and sheets. For purposes of disclosure, the foregoing patents are incorporated herein by reference.

The film had a modulus of 215.65 MPa. Thus, it had excellent dead-fold properties as a result of the inclusion of the inorganic filler and the polylactic acid, which is a generally stiff, crystalline polymer at room temperature. As set forth above, PLA has a glass transition temperature between 50–60° C. The ECOFLEX and thermoplastic starch (TPS) both acted as soft, low glass transition temperature polymers. The TPS, when blended with additional polymers and at very low water, has a glass transition temperature approaching −60° C. The ECOFLEX and TPS thus assisted the blowability and flexibility of the blend. The TPS also increased the natural polymer content, thus making the film more biodegradable.

The foregoing film is used to laminate at least one side of a fibrous sheet, such as a tissue paper, more particularly a 12–15 lb/3000 ft tissue paper, to yield a treated sheet. The treated sheet can be used as a food packaging wrap that resists penetration by water and oils found in food.

Example 7

A film was manufactured from a biodegradable polymer blend having the following mix design, with the concentration being expressed in terms of weight percent of the entire polymer blend:

| | |
|---|---|
| Thermoplastic Starch | 30% |
| BAK 1095 | 60% |
| Inorganic Filler | 10% |

The thermoplastic starch was obtained from Biotec. The BAK 1095 was obtained from Bayer AG, located in Köln, Germany, and was an aliphatic-aromatic polyesteramide. The inorganic filler was calcium carbonate obtained from OMYA, division Pluess-Staufer AG, located in Oftringen, Switzerland.

The foregoing blend was manufactured and blown into films using the proprietary thermoplastic starch extrusion/film blowing apparatus described in Example 6. The film had excellent dead-fold properties as a result of the inclusion of the inorganic filler and the BAK 1095, which is a somewhat stiff, crystalline polymer at room temperature even though it is classified as "film grade". As set forth above, BAK 1095 behaves as if it has a glass transition temperature of at least 10° C. Because the glass transition temperature of BAK 1095 is relatively low compared to PLA, considerably more BAK could be included without destroying the film-blowing properties and flexibility of the resulting film. The TPS acted as the soft, low glass transition temperature polymer, and further assisted the blowability and flexibility of the blend. It also increased the natural polymer content, thus making the film more biodegradable.

The foregoing film is used to laminate at least one side of a fibrous sheet, such as a tissue paper, more particularly a 12–15 lb/3000 ft² tissue paper, to yield a treated sheet. The treated sheet can be used as a food packaging wrap that resists penetration by water and oils found in food.

Examples 8–12

Films were manufactured from biodegradable polymer blends having the following mix designs, with the concentrations being expressed in term of weight percent of the entire polymer blend:

| Example | Biomax 6926 | Ecoflex F | Talc | TiO$_2$ | CaCO$_3$ |
|---|---|---|---|---|---|
| 8 | 76% | 15% | 4.5% | 4.5% | — |
| 9 | 85.5% | 9.5% | — | 5% | — |
| 10 | 70% | 17.5% | — | 2.5% | 10% |
| 11 | 66% | 16.5% | — | 2.5% | 15% |
| 12 | 58% | 24% | — | 3% | 15% |

The talc was supplied by Luzenac, located in Englewood, Colo., having a particle size of 3.8 microns. The titanium dioxide was supplied by Kerr-McGee Chemical, LLC, located in Oklahoma City, Okla., grade TRONOX 470, having a particle size of 0.17 micron. The calcium carbonate was supplied by Omnia, located in Lucerne Valley, Calif., particle size of 2 microns. The foregoing blends were manufactured on a Werner Pfeiderer ZSK twin-screw extruder, and blown into sheets using a Gemini film blowing extruder (L/D 24/1) equipped with a 2 inch barrier mixing screw containing a Maddock shear mixing tip, and a 4 inch diameter die. All of the films had excellent dead-fold properties. The polymer blends of Examples 10–12 were also extruded into sheets using a single screw extruder and a 14 inch flat cast-film die, and the usual nip-rolls and film take-up assembly normal to such a system. All of these films also had excellent dead-fold properties.

The foregoing films are used to laminate at least one side of a fibrous sheet, such as a tissue paper, more particularly a 12–15 lb/3000 ft² tissue paper, to yield a treated sheet. The treated sheet can be used as a food packaging wrap that resists penetration by water and oils found in food.

Examples 13–61

Blown and cast films and sheets were manufactured from biodegradable polymer blends having the following mix designs, with the concentrations being expressed in term of weight percent of the entire polymer blend:

| Example | PLA | Biomax | Ecoflex BX 7000 | Eastar Bio Ultra | Eastar Bio GP | CaCO$_3$ | TiO$_2$ | Starch |
|---|---|---|---|---|---|---|---|---|
| 13 | 30% | 0% | 45% | 0% | 8.25% | 14.5% | 2.25% | 0% |
| 14 | 30% | 0% | 30% | 0% | 13.2% | 23.2% | 3.6% | 0% |
| 15 | 30% | 0% | 25% | 0% | 11.55% | 20.3% | 3.15% | 10% |
| 16 | 50% | 0% | 25% | 0% | 8.25% | 14.5% | 2.25% | 0% |
| 17 | 50% | 0% | 10% | 0% | 13.2% | 23.2% | 3.6% | 0% |
| 18 | 50% | 0% | 5% | 0% | 11.55% | 20.3% | 3.15% | 10% |
| 19 | 50% | 0% | 0% | 0% | 16.5% | 29.0% | 4.5% | 0% |
| 20 | 50% | 0% | 0% | 0% | 13.2% | 23.2% | 3.6% | 10% |
| 21 | 50% | 0% | 0% | 0% | 11.55% | 20.3% | 3.2% | 15% |
| 22 | 50% | 0% | 0% | 0% | 9.9% | 17.4% | 2.7% | 20% |

-continued

| Example | PLA | Biomax | Ecoflex BX 7000 | Eastar Bio Ultra | Eastar Bio GP | CaCO₃ | TiO₂ | Starch |
|---|---|---|---|---|---|---|---|---|
| 23 | 50% | 0% | 0% | 0% | 8.25% | 14.5% | 2.25% | 25% |
| 24 | 27% | 0% | 64% | 0% | 2.97% | 5.22% | 0.81% | 0% |
| 25 | 25% | 0% | 58% | 0% | 5.61% | 9.86% | 1.53% | 0% |
| 26 | 23% | 0% | 54% | 0% | 7.59% | 13.34% | 2.07% | 0% |
| 27 | 30% | 0% | 40% | 0% | 0% | 0.0% | 0.0% | 30% |
| 28 | 15% | 0% | 60% | 0% | 0% | 0.0% | 0.0% | 25% |
| 29 | 25% | 0% | 25% | 0% | 16.5% | 29.0% | 4.5% | 0% |
| 30 | 20% | 0% | 20% | 0% | 19.8% | 34.8% | 5.4% | 0% |
| 31 | 35% | 0% | 5% | 0% | 19.8% | 34.8% | 5.4% | 0% |
| 32 | 40% | 0% | 10% | 0% | 16.5% | 29.0% | 4.5% | 0% |
| 33 | 50% | 0% | 0% | 0% | 16.5% | 29.0% | 4.5% | 0% |
| 34 | 20% | 0% | 0% | 20% | 19.8% | 34.8% | 5.4% | 0% |
| 35 | 27% | 0% | 36% | 0% | 3.3% | 5.8% | 0.9% | 27% |
| 36 | 21% | 0% | 28% | 0% | 9.9% | 17.4% | 2.7% | 21% |
| 37 | 28.5% | 0% | 38% | 5% | 0% | 0% | 0% | 28.5% |
| 38 | 40% | 0% | 0% | 7% | 16.5% | 29.0% | 4.5% | 3% |
| 39 | 40% | 0% | 7% | 0% | 16.5% | 29.0% | 4.5% | 3% |
| 40 | 50% | 0% | 0% | 0% | 16.5% | 29.0% | 4.5% | 0% |
| 41 | 20% | 0% | 0% | 20% | 19.8% | 34.8% | 5.4% | 0% |
| 42 | 30% | 0% | 0% | 14% | 16.5% | 29.0% | 4.5% | 6% |
| 43 | 40% | 0% | 0% | 14% | 13.2% | 23.2% | 3.6% | 6% |
| 44 | 0% | 40% | 0% | 14% | 13.2% | 23.2% | 3.6% | 6% |
| 45 | 0% | 50% | 0% | 0% | 16.5% | 29.0% | 4.5% | 0% |
| 46 | 0% | 45% | 0% | 0% | 18.15% | 31.9% | 4.95% | 0% |
| 47 | 0% | 40% | 0% | 0% | 19.8% | 34.8% | 5.4% | 0% |
| 48 | 0% | 40% | 0% | 0% | 19.8% | 34.8% | 5.4% | 0% |
| 49 | 40% | 0% | 14% | 0% | 13.2% | 23.2% | 3.6% | 6% |
| 50 | 0% | 30% | 0% | 7% | 19.8% | 34.8% | 5.4% | 3% |
| 51 | 0% | 35% | 0% | 7% | 18.15% | 31.9% | 4.95% | 3% |
| 52 | 0% | 38% | 0% | 1.4% | 19.8% | 34.8% | 5.4% | 0.6% |
| 53 | 0% | 35% | 0% | 3.5% | 19.8% | 34.8% | 5.4% | 1.5% |
| 54 | 40% | 0% | 0% | 14% | 13.2% | 23.2% | 3.6% | 6% |
| 55 | 40% | 0% | 0% | 0% | 26.7% | 22.7% | 3.5% | 7.1% |
| 56 | 40% | 0% | 0% | 13.8% | 12.9% | 22.7% | 3.5% | 7.1% |
| 57 | 40% | 0% | 0% | 26.7% | 0% | 22.7% | 3.5% | 7.1% |
| 58 | 40% | 0% | 0% | 13.8% | 12.9% | 22.7% | 3.5% | 7.1% |
| 59 | 40% | 0% | 0% | 0% | 26.7% | 22.7% | 3.5% | 7.1% |
| 60 | 40% | 0% | 0% | 14% | 13.2% | 23.2% | 3.6% | 6% |
| 61 | 0% | 50% | 0% | 0% | 16.5% | 29.0% | 4.5% | 0% |

The compositions of Examples 13–59 were all processed and blown into films using a COLLIN Blown Film Extruder. The films made using the compositions of Examples 30–34, 36, 38, 41 and 43 were tested and found to have dead-folds of 100%, 92%, 92%, 91%, 100%, 100%, 100%, 100% and 100%, respectively. Although films made from the other compositions were not tested for dead-fold, they would be expected to have relatively high dead-fold compared to conventional biopolymers (i.e., at least about 80%). The water vapor transmission rate for films made using the compositions of Examples 36, 38, 41 and 43 were 91.94, 91.32, 98.29 and 80.31 g/m²/day, respectively.

The composition of Example 60 was processed and blown into a film using a BATTENFELD-GLOUCESTER Blown Film Extruder. A film made from this composition was found to have a water vapor transmission rate of 42.48 g/m²/day.

The composition of Example 61 was processed and blown into various films using both a BATTENFELD-GLOUCESTER Blown Film Extruder and a BLACK-CLAWSON Cast Film Extruder. The film formed using the BATTENFELD-GLOUCESTER Blown Film Extruder apparatus was tested and found to have a dead-fold of 100%. Two different thicknesses of films were formed using the BLACK-CLAWSON Cast Film Extruder, one having a thickness of 1.3 mils (0.0013") and another having a thickness of 1.8 mils (0.0018"). Both had a distinctive machine direction orientation because they were cast, rather than blown, films. The 1.3 mil film had a dead-fold of 99%, and the 1.8 mil film had a dead-fold of 100%.

The foregoing films and sheets are used to laminate at least one side of a fibrous sheet, such as a tissue paper, more particularly a 12–15 lb/3000 ft² tissue paper, to yield a treated film or sheet. The treated film or sheet can be used as a food packaging wrap that resists penetration by water and oils found in food.

Example 62

Any of the foregoing biodegradable polymer blends is used to coat or impregnate at least one side of a fibrous sheet. The polymer blend is heated, mixed or otherwise processed into a thermoplastic melt and then spread over a surface of a fibrous sheet using a doctor blade. The fibrous sheet is moved while the doctor blade remains stationary. Alternatively, the polymer blend is sprayed onto the fibrous sheet using spray-coating techniques known in the art.

Example 63

Any of the foregoing biodegradable polymer blends is modified by adding silica or replacing some or all of the calcium carbonate with silica. The modified composition is used to coat or impregnate at least one side of a fibrous sheet. The polymer blend is heated, mixed or otherwise processed into a thermoplastic melt and then spread over a surface of a fibrous sheet using a doctor blade. The fibrous sheet is moved while the doctor blade remains stationary. Alternatively, the polymer blend is sprayed onto the fibrous sheet using spray-coating techniques known in the art.

Example 64

Any of the foregoing compositions is modified by removing at least a portion of the particulate filler and then using the modified biodegradable composition to coat one or both sides of a fibrous sheet.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture that is adapted for use as a food wrap that is both resistant to liquids and biodegradable, comprising:
    a fibrous sheet comprised of thin, flexible tissue paper having a weight up to 15 lb/3000 ft$^2$ prior to being coated or impregnated with any thermoplastic polymers,
    at least a portion of the fibrous sheet being coated and/or impregnated with a biodegradable composition that renders the fibrous sheet more resistant to liquids and that yields an article that is adapted for use as a food wrap such that it is sufficiently thin and flexible so as to be easily wrapped around a food item and that possesses sufficient dead-fold that it will remain wrapped around the food item absent application of an external force, the biodegradable composition comprising:
        at least one soft thermoplastic biodegradable polymer having a glass transition temperature less than about 0° C.; and
        at least one stiff thermoplastic biodegradable polymer having a glass transition temperature of at least about 10° C.

2. An article of manufacture as defined in claim 1, wherein the stiff thermoplastic biodegradable polymer comprises at least one member selected from the group consisting of polylactic acid, polylactic acid derivatives, and a modified polyethylene terephthalate in which a portion of the terephthalate groups are substituted with at least one aliphatic diacid.

3. An article of manufacture as defined in claim 1, wherein the stiff thermoplastic biodegradable polymer comprises at least one of a polyesteramide, a polyhydroxybutyrate having a glass transition temperature of at least about 10° C., a terpolymer including units formed from glycolide, lactide and ε-caprolactone, or a polyesteramide formed from at least one diacid, at least one diol, and at least one amino acid.

4. An article of manufacture as defined in claim 1, wherein the stiff thermoplastic biodegradable polymer comprises at least one of a polylactic acid or a polylactic acid derivative.

5. An article of manufacture as defined in claim 1, wherein the soft thermoplastic biodegradable polymer comprises at least one of an aliphatic-aromatic copolyester, an aliphatic polyester including units formed from at least one of a lactide or a hydroxyacid having at least 4 carbon atoms, polyhydroxybutyrate, a polyester including units formed from succinic acid and an aliphatic diol, polycaprolactone, polyhydroxybutyrate-hydroxyvalerate copolymer, polybutylene succinate, polybutylene succinate adipate, polyethylene succinate, or thermoplastic starch.

6. An article of manufacture as defined in claim 1, wherein the soft thermoplastic biodegradable polymer comprises at least one of an aliphatic-aromatic copolyester including units formed from an aliphatic diol, an aliphatic diacid and an aromatic diacid or an aliphatic-aromatic copolyester including units formed from adipic acid, dialkyl terephthalate, and at least one aliphatic diol.

7. An article of manufacture as defined in claim 1, wherein the stiff thermoplastic biodegradable polymer is included in a range of about 20% to about 99% by weight of the biodegradable composition.

8. An article of manufacture as defined in claim 1, wherein the stiff thermoplastic biodegradable polymer is included in a concentration of at least about 40% by weight of the biodegradable composition.

9. An article of manufacture as defined in claim 1, wherein the stiff thermoplastic biodegradable polymer is included in a concentration greater than 50% by weight of the biodegradable composition.

10. An article of manufacture as defined in claim 1, wherein the stiff thermoplastic biodegradable polymer has a glass transition temperature of at least about 15° C.

11. An article of manufacture as defined in claim 1, wherein the stiff thermoplastic biodegradable polymer has a glass transition temperature of at least about 25° C.

12. An article of manufacture as defined in claim 1, wherein the stiff thermoplastic biodegradable polymer has a glass transition temperature of at least about 35° C.

13. An article of manufacture as defined in claim 1, wherein the soft thermoplastic biodegradable polymer is included in a concentration up to about 70% by weight of the biodegradable composition.

14. An article of manufacture as defined in claim 1, wherein the soft thermoplastic biodegradable polymer is included in a concentration less than 50% by weight of the biodegradable composition.

15. An article of manufacture as defined in claim 1, wherein the soft thermoplastic biodegradable polymer is included in a concentration up to about 45% by weight of the biodegradable composition.

16. An article of manufacture as defined in claim 1, wherein the soft thermoplastic biodegradable polymer has a glass transition temperature less than about −4° C.

17. An article of manufacture as defined in claim 1, wherein the soft thermoplastic biodegradable polymer has a glass transition temperature less than about −10° C.

18. An article of manufacture as defined in claim 1, wherein the soft thermoplastic biodegradable polymer has a glass transition temperature less than about −20° C.

19. An article of manufacture as defined in claim 1, wherein the soft thermoplastic biodegradable polymer has a glass transition temperature less than about −30° C.

20. An article of manufacture as defined in claim 1, the biodegradable composition further comprising at least one particulate filler.

21. An article of manufacture as defined in claim 20, the particulate filler being included in an amount so as to render the article of manufacture microwaveable.

22. An article of manufacture as defined in claim 20, the particulate filler being included in an amount of at least about 10% by weight of the biodegradable composition.

23. An article of manufacture as defined in claim 20, the particulate filler being included in an amount of at least about 20% by weight of the biodegradable composition.

24. An article of manufacture as defined in claim 20, the particulate filler being included in an amount of at least about 30% by weight of the biodegradable composition.

25. An article of manufacture as defined in claim 20, the particulate filler comprising at least one of silica, calcium carbonate, clay, talc, mica, alumina, or ceramic.

26. An article of manufacture as defined in claim 1, the biodegradable composition comprising a film or sheet that has been laminated to at least one side of the fibrous sheet.

27. An article of manufacture as defined in claim 1, the thin, flexible tissue paper comprising 12–15 lb/3000 ft$^2$ tissue paper prior to being coated or impregnated with the biodegradable composition.

28. An article of manufacture that is adapted for use as a food wrap that is both resistant to liquids and biodegradable, comprising:

a fibrous sheet comprised of thin, flexible tissue paper, at least a portion of the fibrous sheet being coated and/or impregnated with a biodegradable composition that renders the fibrous sheet more resistant to liquids and that yields an article that is adapted for use as a food wrap such that it is sufficiently thin and flexible so as to be easily wrapped around a food item and that possesses sufficient dead-fold that it will remain wrapped around the food item absent application of an external force, the biodegradable composition comprising at least one member selected from the group consisting of polyhydroxybutyrate, polylactic acid, and aliphatic-aromatic copolymers and at least about 20% by weight of a particulate filler.

29. An article of manufacture as defined in claim 28, the thin, flexible tissue paper having a weight of up to 15 lb/3000 ft$^2$ prior to being coated or impregnated.

30. An article of manufacture as defined in claim 28, the thin, flexible tissue paper comprising 12–15 lb/3000 ft$^2$ tissue paper prior to being coated or impregnated.

31. An article of manufacture as defined in claim 28, the biodegradable composition comprising at least about 30% by weight of an inorganic filler.

32. An article of manufacture as defined in claim 31, the inorganic filler comprising at least one of silica, sand, crushed rock, bauxite, granite, limestone, sandstone, glass beads, aerogel, xerogel, mica, clay, alumina, kaolin, microspheres, hollow glass spheres, porous ceramic spheres, gypsum, insoluble salts, calcium carbonate, magnesium carbonate, calcium aluminate, magnesium carbonate, titanium dioxide, talc, ceramic, zirconium compounds, xonotlite (a crystalline calcium silicate gel), lightweight expanded clay, perlite, vermiculite, pumice, zeolites, minerals, or other geologic material.

33. An article of manufacture that is adapted for use as a food wrap that is both resistant to liquids and biodegradable, comprising:

a fibrous sheet comprised of thin, flexible tissue paper, at least a portion of the fibrous sheet being coated and/or impregnated with a biodegradable composition that renders the fibrous sheet more resistant to liquids and that yields an article that is adapted for use as a food wrap such that it is sufficiently thin and flexible so as to be easily wrapped around a food item and that possesses sufficient dead-fold that it will remain wrapped around the food item absent application of an external force, the biodegradable composition comprising:

at least one biodegradable polymer comprising at least one member selected from the group consisting of polyesteramides, polyhydroxybutyrate, terpolymers including units formed from glycolide, lactide and ε-caprolactone, polylactic acid, polylactic acid derivatives, aliphatic polyesters, polyesters including units formed from succinic acid and an aliphatic diol, polycaprolactone, polyhydroxybutyrate-hydroxyvalerate copolymer, polybutylene succinate, polybutylene succinate adipate, polyethylene succinate, thermoplastic starch, aliphatic-aromatic copolyesters including units formed from an aliphatic diol, an aliphatic diacid and an aromatic diacid and having a glass transition temperature less than about 0° C., and aliphatic-aromatic copolyesters including units formed from adipic acid, dialkyl terephthalate, and at least one aliphatic diol and having a glass transition temperature less than about 0° C.; and at least one inorganic filler included in a concentration of at least about 20% by weight of the biodegradable composition.

34. An article of manufacture as defined in claim 33, wherein the biodegradable composition comprises at least one soft biodegradable polymer having a glass transition temperature less than about 0° C.

35. An article of manufacture as defined in claim 34, wherein the biodegradable composition further comprises at least one stiff biodegradable polymer having a glass transition temperature of at least about 10° C.

36. An article of manufacture as defined in claim 34, wherein the biodegradable composition comprises silica as the inorganic filler.

37. An article of manufacture as defined in claim 36, wherein the article of manufacture is microwaveable.

38. An article of manufacture as defined in claim 33, the thin, flexible tissue paper comprising 12–15 lb/3000 ft$^2$ tissue paper.

39. An article of manufacture that is adapted for use as a food wrap and that is both resistant to liquids and biodegradable, the article manufactured according to a process comprising:

providing a fibrous sheet comprised of thin, flexible tissue paper; and coating and/or impregnating at least one side of the fibrous sheet with a thermoplastic biodegradable composition that includes a biodegradable polymer at least about 20% by weight of a particulate filler in order to render the fibrous sheet more resistant to liquids and to yield an article that is adapted for use as a food wrap such that it is sufficiently thin and flexible so as to be easily wrapped around a food item and that possesses sufficient dead-fold that it will remain wrapped around the food item absent application of an external force.

40. An article of manufacture as defined in claim 39, the process for manufacturing the article further comprising:

heating the thermoplastic biodegradable composition so as to form a thermoplastic melt comprising an initially flowable composition;

applying the thermoplastic melt to at least one side of the fibrous sheet so as to coat or impregnate the fibrous sheet; and allowing the thermoplastic melt to harden.

41. An article of manufacture as defined in claim 40, wherein the thermoplastic melt is applied to the at least one side of the fibrous sheet using a doctor blade or by spraying.

42. An article of manufacture as defined in claim 41, wherein the thermoplastic melt has a melt flow index of at least about 40 g/10 min.

43. An article of manufacture as defined in claim 41, wherein the thermoplastic melt has a melt flow index of at least about 70 g/10 min.

44. An article of manufacture as defined in claim 41, wherein the thermoplastic melt has a melt flow index of at least about 100 g/10 min.

45. An article of manufacture as defined in claim 39, the process for manufacturing the article further comprising:
heating the thermoplastic biodegradable composition so as to form a thermoplastic melt comprising an initially flowable composition;
forming a sheet or film from the thermoplastic melt; and
laminating the sheet or film to at least one side of the fibrous sheet.

46. An article of manufacture as defined in claim 45, wherein the sheet or film is formed by at least one of casting, extrusion or blowing.

47. An article of manufacture as defined in claim 46, wherein the sheet or film is laminated to the fibrous sheet by co-extrusion.

48. An article of manufacture as defined in claim 39, the thin, flexible tissue paper having a weight of up to 15 lb/3000 ft$^2$ prior to being coated or impregnated.

49. An article of manufacture as defined in claim 48, the thin, flexible tissue paper comprising 12–15 lb/3000 ft$^2$ tissue paper prior to being coated or impregnated.

* * * * *

UNITED STATES PATENT AND TRADEMARK OFFICE
CERTIFICATE OF CORRECTION

PATENT NO. : 7,172,814 B2
APPLICATION NO. : 10/453318
DATED : February 6, 2007
INVENTOR(S) : Simon K. Hodson It is certified that error appears in the above-identified patent and that said Letters Patent is hereby corrected as shown below:

<u>Title Page, Item 54, Title, and Column 1, Line 3</u>
Change "POLYMERS BLENDS" to --POLYMER BLENDS--

<u>Column 7</u>
Line 63, after "packaging arts", insert --.--

<u>Column 11</u>
Line 4, change "85%" to --85--
Line 11, remove second instance of "and" from the equation.
Line 13, before "the remainder", insert --and--

<u>Column 17</u>
Line 37, change "reasons, including but" to --reasons including, but--

<u>Column 25</u>
Line 27, change "0.75" ∓ 0.05"" to --0.75" ± 0.05"--
Line 41, change "23" to --23°--

<u>Column 28</u>
Line 54, change "show" to --shown--
Line 54, change "charts 1-8" to --charts 1-9--
Line 54, change "FIGS. 1-8" to --FIGS. 1-9--

Signed and Sealed this

Seventh Day of August, 2007

JON W. DUDAS
*Director of the United States Patent and Trademark Office*